(12) United States Patent
Li

(10) Patent No.: US 11,509,973 B2
(45) Date of Patent: Nov. 22, 2022

(54) METHOD AND APPARATUS FOR SYNTHESIZING VIDEO

(71) Applicant: Beijing Dajia Internet Information Technology Co., Ltd., Beijing (CN)

(72) Inventor: Qian Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 24 days.

(21) Appl. No.: 17/030,959

(22) Filed: Sep. 24, 2020

(65) Prior Publication Data
US 2021/0168473 A1   Jun. 3, 2021

(30) Foreign Application Priority Data
Nov. 28, 2019   (CN) .......................... 201911194514.4

(51) Int. Cl.
| | |
|---|---|
| H04N 21/854 | (2011.01) |
| H04N 21/472 | (2011.01) |
| H04N 21/4788 | (2011.01) |
| H04N 21/482 | (2011.01) |
| H04N 21/81 | (2011.01) |
| G11B 27/031 | (2006.01) |

(52) U.S. Cl.
CPC ......... *H04N 21/854* (2013.01); *G11B 27/031* (2013.01); *H04N 21/4788* (2013.01); *H04N 21/47214* (2013.01); *H04N 21/4826* (2013.01); *H04N 21/8166* (2013.01)

(58) Field of Classification Search
CPC ........... H04N 21/854; H04N 21/47214; H04N 21/4788; H04N 21/4826; H04N 21/8166; H04N 21/2743; H04N 21/47205; H04N 21/4882; G11B 27/031; G11B 27/34
See application file for complete search history.

(56) References Cited

U.S. PATENT DOCUMENTS

2019/0205015 A1*   7/2019   Smith ................. G06F 3/04883

FOREIGN PATENT DOCUMENTS

| CN | 106373170 A | 2/2017 |
|---|---|---|
| CN | 106446056 A | 2/2017 |
| CN | 108289057 A | 7/2018 |

(Continued)

OTHER PUBLICATIONS

Mehvish (Dec. 19, 2018) "A guide to Instagram Story Stickers with Their Meaning", https://www.guidingtech.com/instagram-story-stickers-meaning (Year: 2018).*

(Continued)

*Primary Examiner* — Kunal Langhnoja
(74) *Attorney, Agent, or Firm* — Timothy W. Menasco, Esq.; Harter Secrest & Emery LLP

(57) ABSTRACT

The present disclosure provides a method and an apparatus for synthesizing a video, and a storage medium. The method is implemented as follows. A video to be synthesized is displayed on a video editing interface. In response to a video sharing instruction, a friend recommendation list is acquired and displayed. The friend recommendation list is used for indicating a plurality of sharing objects. A synthesized video is generated based on the video and the target sharing object. A reminding mark for indicating the target sharing object is displayed on a video picture of the synthesized video.

15 Claims, 21 Drawing Sheets

(56) References Cited

FOREIGN PATENT DOCUMENTS

| CN | 108667633 A | 10/2018 |
|---|---|---|
| CN | 108900791 A | 11/2018 |
| CN | 109547841 A | 3/2019 |

OTHER PUBLICATIONS

Chacon (Nov. 16, 2016) "3 New Features for Instagram Stories: GIFs, Mentions, and Links", https://later.com/blog/3-new-features-for-instagram-stories-gifs-mentions-and-links/ (Year: 2016).*
OA1 for CN Application 201911194514.4.
English translation of OA1 for CN Application 201911194514.4.

* cited by examiner

METHOD AND APPARATUS FOR SYNTHESIZING VIDEO

CROSS REFERENCE TO RELATED APPLICATIONS

The present application is based on and claim priority under 35 U.S.C. § 119 to Chinese Application No. 201911194514.4, filed with the China National Intellectual Property Administration on Nov. 28, 2019, the entire content of which is incorporated herein by reference.

FIELD

The present disclosure relates to a technical field of short videos, and particularly, to a method and an apparatus for synthesizing a video.

BACKGROUND

Currently, short video applications are used by an increasing number of people. When a video editing user publishes a video through a short video application, some friends are usually selected when the video is published to prompt the friends to watch the video.

SUMMARY

The disclosure provides a method and an apparatus for synthesizing a video. The technical solution of the present disclosure will be explained as follows.

Embodiments of the present disclosure provide a method for synthesizing a video, the method includes: displaying the video on a video editing interface; acquiring a friend recommendation list in response to a video sharing instruction; in which the friend recommendation list is used for indicating a plurality of sharing objects; displaying the friend recommendation list and generating a synthesized video based on the video and a target sharing object selected from the plurality of sharing objects, wherein a reminding mark for indicating the target sharing object is displayed on a video picture of the synthesized video.

Embodiments of the present disclosure provide an apparatus for synthesizing a video. The apparatus includes a displaying module, a recommending module and a video synthesis module. The displaying module is configured to display the video on a video editing interface. The recommending module is configured to acquire a friend recommendation list and display the friend recommendation list in response to a video sharing instruction. The friend recommendation list is used for indicating a plurality of sharing objects. The video synthesis module is configured to generate a synthesized video based on the video to be synthesized and a target sharing object selected from the plurality of sharing objects. A reminding mark for indicating the target sharing object is displayed on a video picture of the synthesized video.

Embodiments of the present disclosure provide a video synthesis device. The device includes a processor and a memory. The memory is configured to store instructions executable by the processor; the processor is configured to execute the instructions to implement the method for synthesizing a video as described above.

Embodiments of the present disclosure provide a non-transitory computer-readable storage medium including instructions that, when executed by a processor of the apparatus for synthesizing a video, cause the video synthesis apparatus to perform the method for synthesizing a video as described above.

Embodiments of the present disclosure provide a computer program product which, when running on the video synthesis device, causes the video synthesis device to perform the method for synthesizing a video described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure and are not to be construed as limiting the present disclosure.

DETAILED DESCRIPTION

In order to make the technical solution of the present disclosure better understood, the technical solution in embodiments of the present disclosure will be clearly and completely described below with reference to the accompanying drawings.

It should be noted that the terms "first", "second" and the like in the specification and claim of the present disclosure and in the foregoing drawings are used for distinguishing between similar elements and not necessarily for describing a certain sequential or chronological order. It is to be understood that the data so used is interchangeable under appropriate circumstances such that embodiments of the present disclosure described herein are capable of operation in other sequences than those illustrated or described herein. Implementations described in the exemplary embodiments below do not represent all implementations consistent with the present disclosure. Rather, they are merely examples of the apparatus and method consistent with certain aspects of the present disclosure, as detailed in the appended claims.

In addition, in the description of embodiments of the present disclosure, "/" indicates an inclusive meaning unless otherwise specified, for example, A/B may indicate A or B; "and/or" herein is merely an association relationship describing associated objects, and means that there may be three relations, for example, A and/or B may refers to: A exists alone, A and B exist simultaneously, and B exists alone. In addition, in the description of embodiments of the present disclosure, "a plurality of" refers to two or more than two.

Figure 1A:
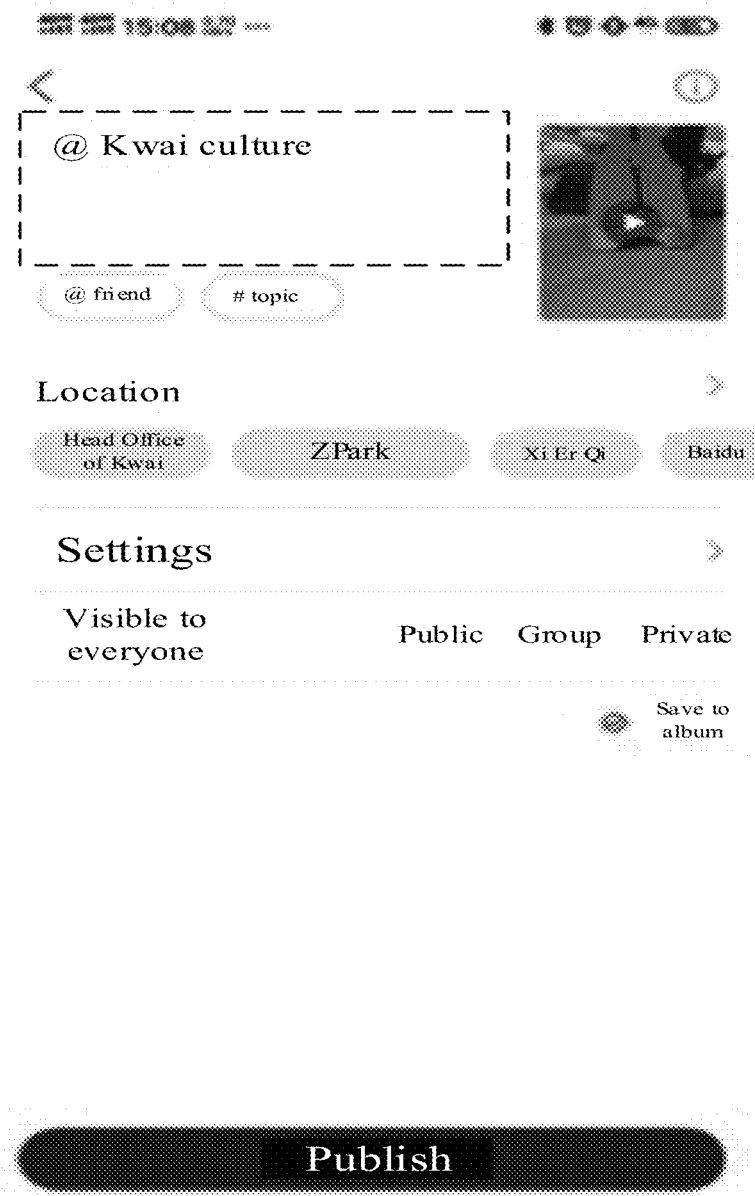
FIG. 1A is a schematic diagram illustrating a cell phone interface according to an exemplary embodiment.

In the existing short video applications, when the user needs to remind the friends to watch the video to be published, the user needs to launch a video publishing interface, and then adds the friends whom the user wants to tag (@) in the video publishing interface. For example, as illustrated in FIG. 1A, a schematic view of the video publishing interface provided by the present disclosure is shown, in which a text input box (specifically, a dashed box in FIG. 1A) is displayed, and two controls are displayed below the text input box: "@ friend" control and "# topic" control. The user needs to click the "@ friend" control in the video publishing interface and selects the friend to be tagged (@), then a reminding mark in a style of "@***" is displayed in the text input box for representing the user whom is tagged. As illustrated in FIG. 1A, if the user selects a friend with a name of "Kwai culture" to be tagged, the reminding mark in the style of "@ Kwai culture" is displayed in the text input box. Then, after the user clicks a "publish" control in a lower part of FIG. 1A, a video publishing is completed.

Figure 1B:
FIG. 1B is a schematic diagram illustrating a cell phone interface according to an exemplary embodiment.

After the video publishing is completed, as illustrated in FIG. 1B, a video playing interface for the video is provided. The reminding mark in the style of "@ Kwai culture" is displayed in the text below the video picture, and the reminding mark represents that when the video editing user "Zhang San 014" publishes the video, the user "Kwai culture" is reminded to watch the video.

In the prior art, when the friend is reminded, the friend required to be reminded only may be added in the video publishing interface. And no change can be made to the style of the reminding mark representing @ friend. A user experience is poor.

The disclosure provides a video synthesis method and a video synthesis apparatus, which are used for at least solving a problem of a poor user experience of reminding friends when a video is published in the related art.

First, an application scenario of the technical solution provided by the present disclosure is introduced.

Figure 1C:
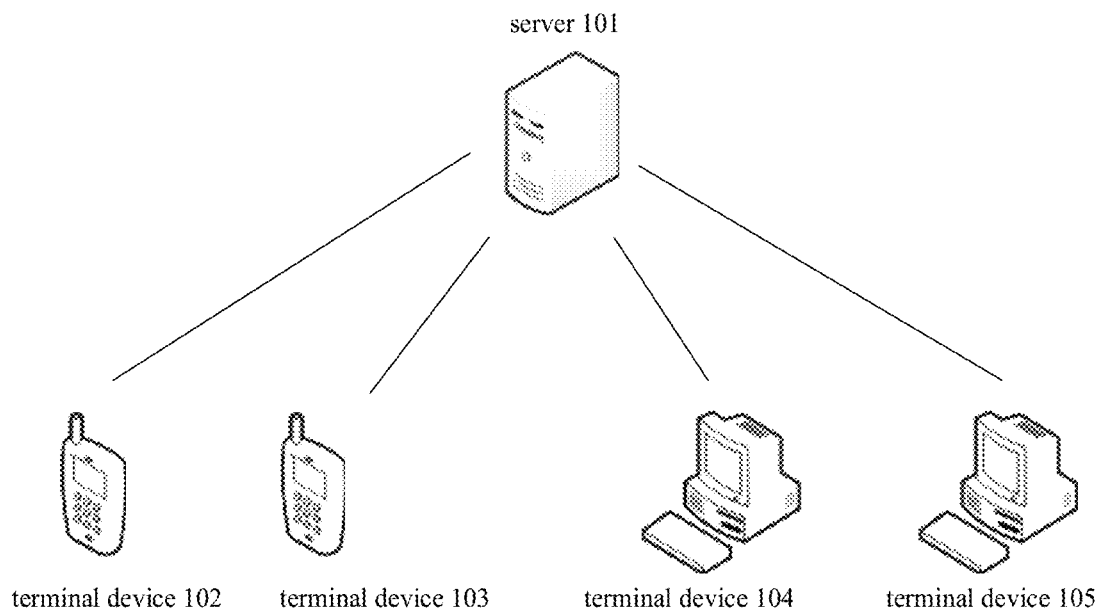
FIG. 1C is a schematic diagram of a network architecture according to an example embodiment.

Referring to FIG. 1C, a schematic diagram of an implementation environment involved in a method for synthesizing a video provided by the embodiment of the present disclosure is shown. As illustrated in FIG. 1C, the implementation environment may include a server 101 and a plurality of terminal devices (e.g., a terminal device 102, a terminal device 103, a terminal device 104, and a terminal device 105) which may be connected to the server 101 through a wired network or a wireless network.

Exemplarily, the terminal device in embodiments of the present disclosure may be a mobile phone, a tablet computer, a desktop computer, a laptop computer, a handheld computer, a notebook computer, an ultra-mobile personal computer (UMPC), a netbook, a cellular phone, a Personal Digital Assistant (PDA), an Augmented Reality (AR) device, a Virtual Reality (VR) device, and the like, which may be installed with an instant messaging application and communicate using the instant messaging application, and a specific form of the electronic device is not limited in the embodiments of the present disclosure.

The server 101 may be a network device for storing video data published by a terminal device and distributing the stored video data to a terminal device playing a video. Specifically, each of the plurality of terminal devices may publish an edited video to the server 101. In addition, when a plurality of terminal devices are to play the video, the plurality of terminal devices may access the server 101 to acquire and play the video stored in the server 101.

The method for synthesizing a video provided by embodiments of the present disclosure is described below with reference to specific embodiments, and the method provided by this embodiment may be applied to one of the terminal devices in FIG. 1C, so that when the terminal device publishes the video data, a target sharing object that needs to be reminded may be determined on a video editing interface, and when the video is published on a video publishing interface, the video data with a reminding mark displayed on a video picture is published. Specifically, the video data may be published to the server 101 in FIG. 1C.

Figure 2A:
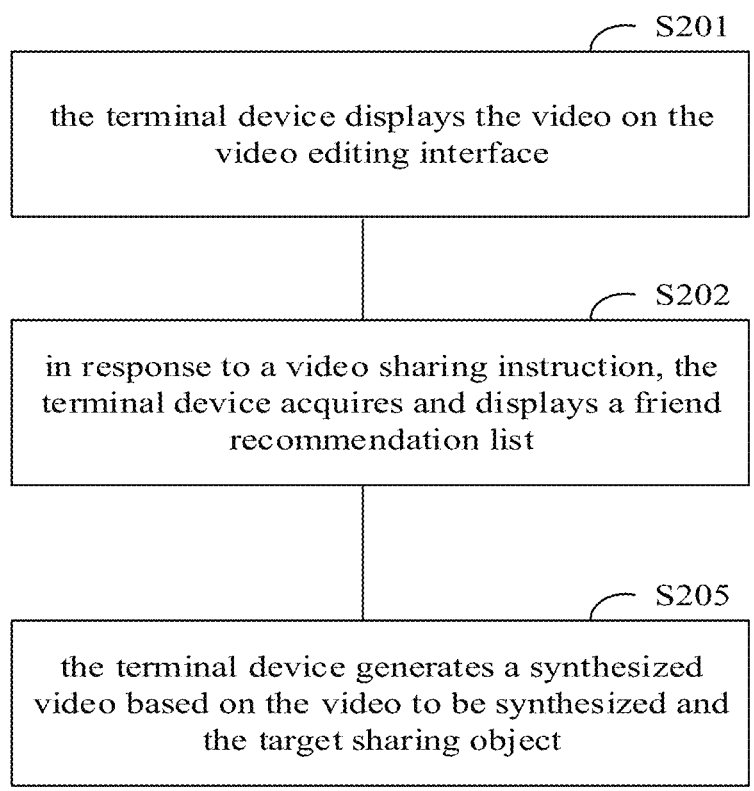
FIG. 2A is a flow diagram illustrating a method for synthesizing a video according to an exemplary embodiment.

FIG. 2A illustrates a method for synthesizing a video according to an embodiment. As illustrated in FIG. 2A, the method includes the following blocks. The method may be implemented by a terminal device.

At S201, the terminal device displays a video on a video editing interface.

At S202, the terminal device acquires and displays a friend recommendation list in response to a video sharing instruction.

In some embodiments, the friend recommendation list may include a plurality of sharing objects.

At S205, the terminal device generates a synthesized video based on the video and a target sharing object selected from the plurality of sharing objects.

A reminding mark for indicating the target sharing object is displayed on a video picture of the synthesized video.

Figure 2B:
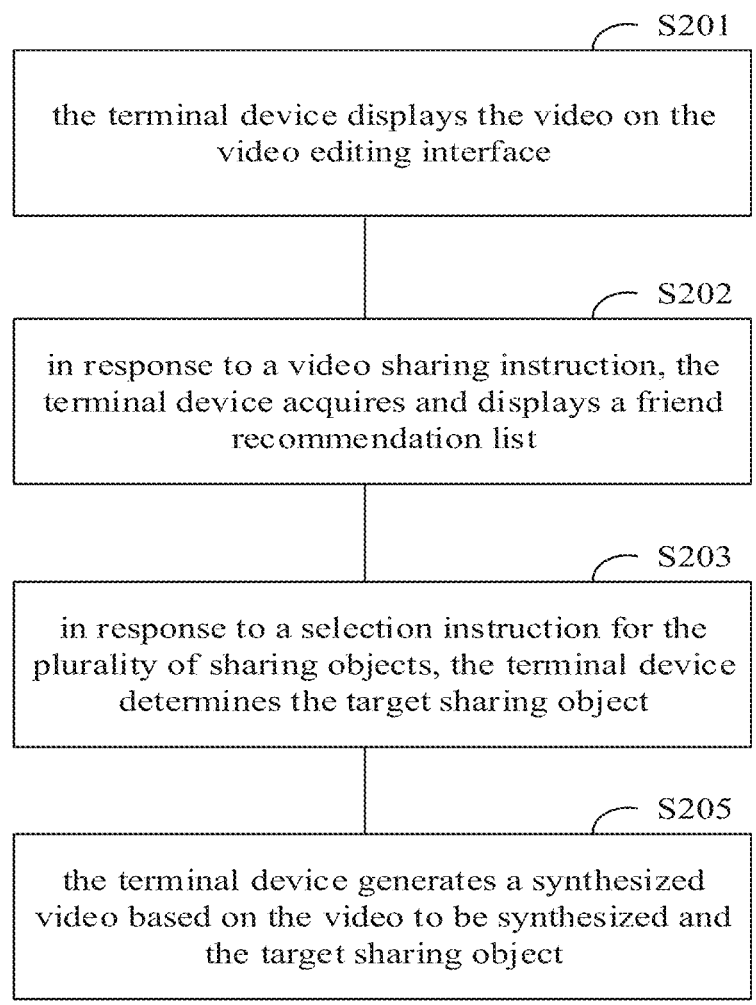
FIG. 2B is a flow diagram illustrating a method for synthesizing a video according to an exemplary embodiment.

In some embodiments, as illustrated in FIG. 2B, the method may include the following steps S201-S203 and S205:

At S201, a terminal device displays a video to be synthesized on a video editing interface.

For example, in order to edit a video file, the video editing interface for editing the video file is generally provided in a short video application. The video editing interface displays picture content of the video to be synthesized, which needs to be edited, so that a user may correspondingly edit the picture content of the video to be synthesized.

At S202, in response to a video sharing instruction, the terminal device acquires and displays a friend recommendation list.

In some embodiments, the video sharing instruction may be sent from a video editing user, for example, by a user interface of the terminal device. The friend recommendation list is used for indicating a plurality of sharing objects.

The plurality of sharing objects may specifically include a plurality of friends of the video editing user. The friend recommendation list may include identifications of the plurality of sharing objects. For example, the friend recommendation list includes any one or more of head portraits, nicknames, and remark names of the plurality of sharing objects described therein. For example, the friend recommendation list may include the head portraits and the nicknames of the plurality of sharing objects, or the friend recommendation list may include the head portraits and the remark names of the plurality of sharing objects, and the like. Certainly, the friend recommendation list may further include other information for distinguishing an identity of each of the plurality of sharing objects.

The video editing interface in the present disclosure includes an interface for editing content of the video data. Specifically, on the video editing interface, the user may edit the video picture of the video data. For example, cool and warm tones in the video picture may be adjusted, stickers may be added to the video picture, beauty effects may be added to a person in the video picture, magic expressions may be added to the person in the video picture, and the like.

It should be noted that, the video editing user referred to in the present disclosure may include the user logged in through a current terminal device.

In some cases, one of the plurality of sharing objects may have both a nickname and a remark name, while the remark name of the sharing object is usually set by the video editing user in order to distinguish the sharing object from other sharing objects, and the nickname is a name taken by the sharing object itself. Therefore, in order to enable the video editing user to distinguish each of the plurality of sharing objects, in the present disclosure, if at least one sharing object in the plurality of sharing objects indicated by the friend recommendation list includes the remark name, the identifications of the plurality of sharing objects included in the friend recommendation list specifically include: the remark name of the at least one sharing object, and the nicknames of the other sharing objects.

In addition, the video sharing instruction in the present disclosure may include a preset symbol, for example, "@". Of course, the video sharing instruction may be other symbols, for example, "#", "@", and the like.

In the present disclosure, the video sharing instruction may include an instruction with the preset symbol displayed by the terminal device in response to a first operation of the user on the video editing interface. For example, the video sharing instruction may be an instruction with the @ symbol displayed by the terminal device in a text input box in response to the first operation that the user inputs "@" in the text input box on the video editing interface. For another example, the video sharing instruction may also be an instruction displaying a friend sticker containing the video sharing instruction by the terminal device on the video editing interface in response to a second operation of the user for a friend sticker control on the video editing interface.

At S203, in response to a selection instruction for the plurality of sharing objects, the terminal device determines the target sharing object.

The selection instruction may be sent from the video editing user and include a third operation performed by the video editing user on the friend recommendation list displayed on the video editing interface.

Specifically, the video editing interface may include one or more preset friend recommendation positions, the one or more preset friend recommendation positions are used to display the identifications of one or more sharing objects in the plurality of sharing objects indicated by the friend recommendation list. The selection instruction from the video editing user to select the sharing object may be a click operation of the video editing user for a friend recommendation position in the one or more friend recommendation positions. After the terminal device detects the click operation for the friend recommendation position in the one or more friend recommendation positions, the target sharing object is determined from the plurality of sharing objects indicated by the friend recommendation list.

At S205, the terminal device generates a synthesized video based on the video to be synthesized and the target sharing object.

The reminding mark for indicating the target sharing object is displayed on a video picture of the synthesized video.

In the present disclosure, the reminding mark is displayed on the video picture by generating the synthesized video in which the reminding mark is displayed on the video picture. Compared with the method for adding the reminding mark on the video publishing interface in the prior art, the video synthesis method provided by the present disclosure adds the reminding mark on the video editing interface, and further adds the reminding mark into the video picture, so that the way of reminding the sharing object is enriched, and the user experience is improved.

Specifically, after the synthesized video is generated in step S205, the terminal device may display the video picture of the synthesized video on the video editing interface, so that the video editing user may preview information such as position, style, size, and the like of the reminding mark. The reminding mark may specifically be: symbol @ and a target identification behind the symbol @. The target identification includes an identification of the target sharing object.

Figure 2C:
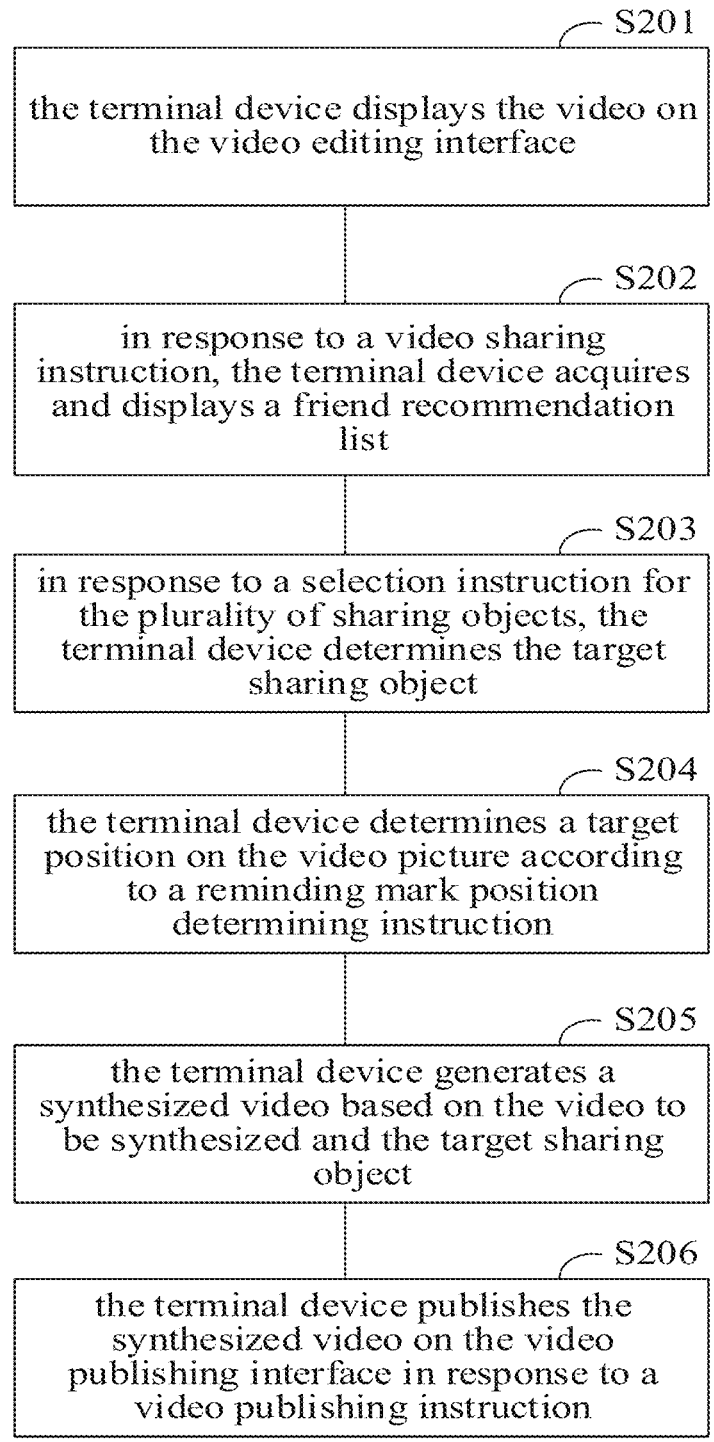
FIG. 2C is a flow diagram illustrating a method for synthesizing a video according to an exemplary embodiment.

In one implementation, a display location of the reminding mark on the video picture is selected in order to satisfy the user's preference. As illustrated in FIG. 2C, before step S205 is performed, the method may further include the follows.

At S204, the terminal device determines a target position on the video picture according to a reminding mark position determining instruction.

Specifically, the reminding mark position determining instruction may include a fifth operation performed by the user on the target position on the video picture displayed on the video editing interface.

Further, in the synthesized video generated in step S205, the reminding mark for indicating the target sharing object may be displayed at the target position on the video picture of the synthesized video.

In the present disclosure, before the video data is published, the target position of the reminding mark on the video picture is determined according to the reminding mark position determining instruction, so that the user can set the position of the reminding mark on the video picture of the synthesized video according to his/her own preference. The user experience is improved.

Further, in one implementation, as illustrated in FIG. 2C, in the method provided by the present disclosure, after the terminal device generates the synthesized video based on the video to be synthesized and the target sharing object at step S205, the method further includes the follows.

At S206, the terminal device publishes the synthesized video on a video publishing interface in response to a video publishing instruction.

The video publishing instruction may be sent from the video editing user and may include a fourth operation of clicking the video publishing interface by the user. The fourth operation may be an operation of clicking a publish control. In addition, the video publishing instruction may also be another instruction for triggering publishing of the video data in the terminal device. For example, after a function of publishing at a fixed time is set in the terminal device, the video publishing instruction may be an instruction that the terminal device determines that a preset time is up.

In the prior art, when the video is published, if a certain sharing object (for example, a friend of the video editing user) is to be reminded to watch the video, it is only possible to add a text for reminding the sharing object on the video publishing interface (for example, a text of "@ friend" is input on the video publishing interface), so that when the video is played, information for reminding the sharing object may only be displayed at a preset text display position. In the video synthesis method provided by the present disclosure, in the process of editing the displayed video to be synthesized on the video editing interface, after the video sharing instruction (for example, a symbol "@" is received) is received, the friend recommendation list of the video editing user is obtained in response to the video sharing instruction, and then the target sharing object is determined in response to the selection instruction. And the reminding mark is displayed on the video picture by generating the synthesized video with the reminding mark displayed on the video picture. Compared with the method for adding the reminding mark on the video publishing interface in the prior art, the video synthesis method provided by the present disclosure adds the reminding mark on the video editing interface, and further adds the reminding mark to the video picture, so that the way of reminding the sharing object is enriched, and the user experience is improved.

Figure 2D:
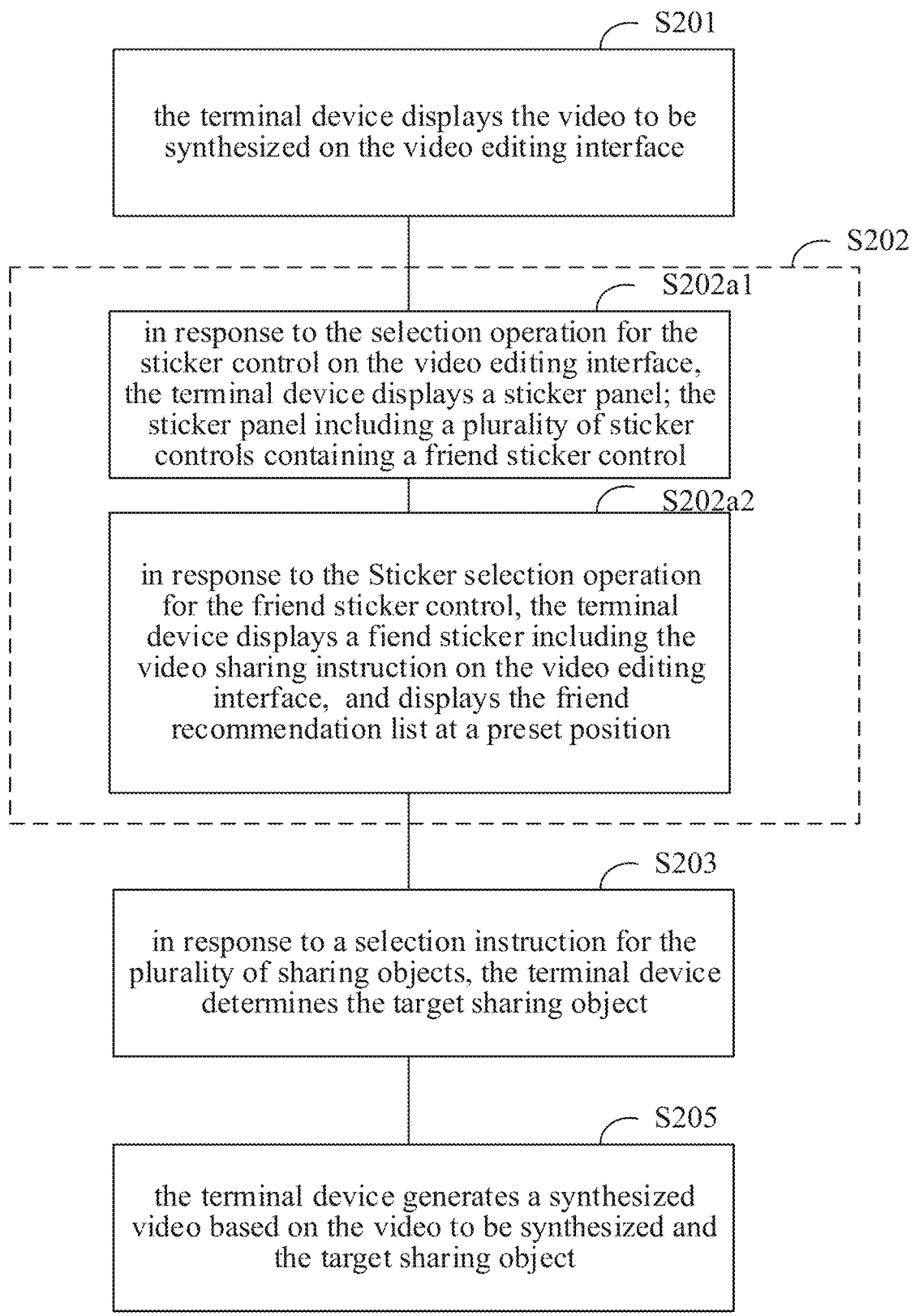
FIG. 2D is a flow diagram illustrating a method for synthesizing a video according to an exemplary embodiment.
Figure 2E:
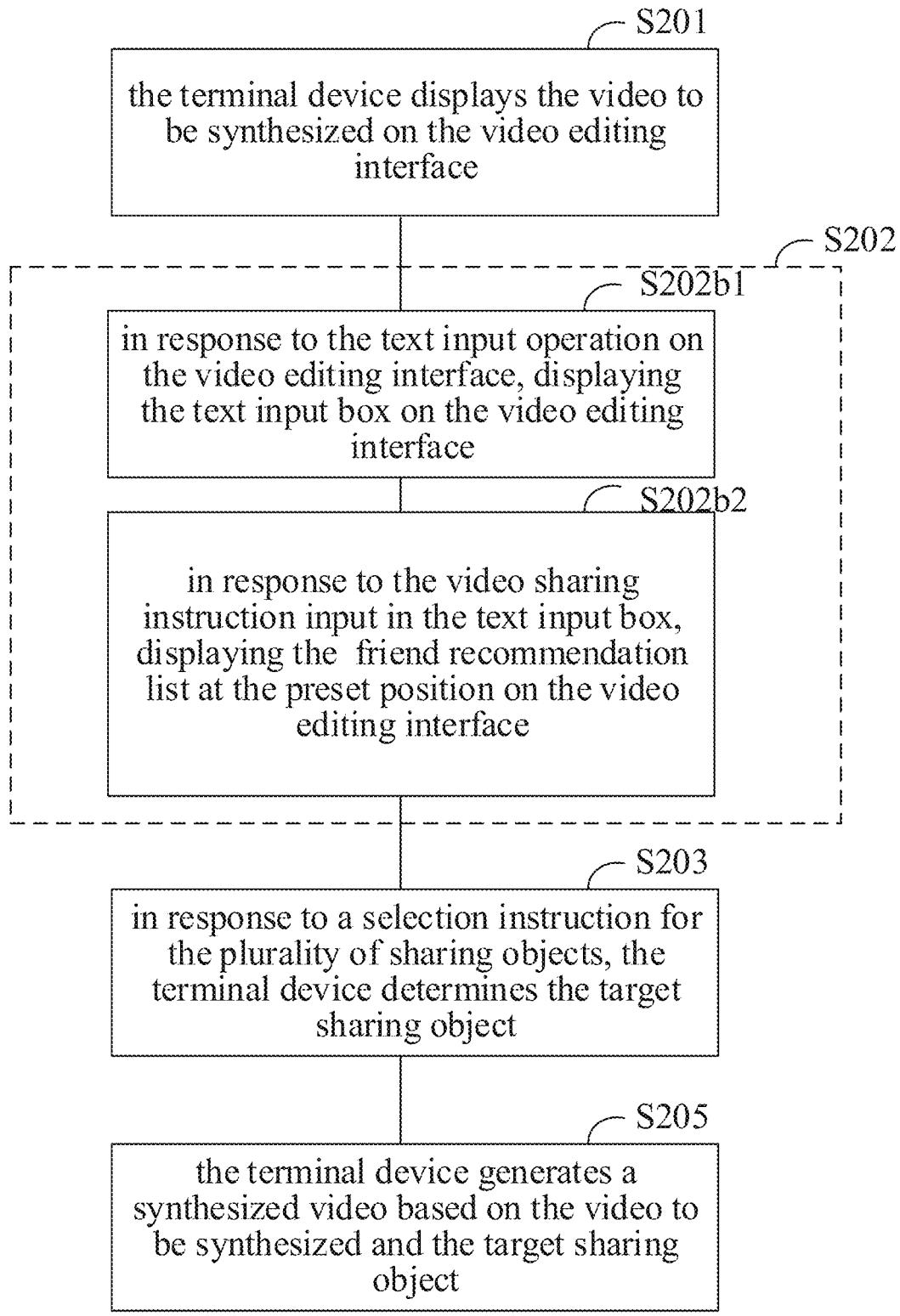
FIG. 2E is a flow diagram illustrating a method for synthesizing a video according to an exemplary embodiment.

In one possible approach, the friend sticker may be added to a sticker function of the video editing interface. When the terminal device receives the operation of selecting the friend sticker by the user, the step S202 is triggered to respond to the video sharing instruction from the video editing user, the friend recommendation list of the video editing user is obtained and displayed. Moreover, the identification of the target sharing object selected in S203 may be displayed in the friend sticker. And when the video is published, the friend sticker may be used as the reminding mark which is displayed on the video picture and used for indicating the target sharing object. Based on the above consideration, as illustrated in FIG. 2D, the step S202 in the above embodiment may include the following steps S202a1-S202a2.

At S202a1, the terminal device displays a sticker panel on the video editing interface in response to a selection operation for the sticker control. The sticker panel includes a plurality of sticker controls containing the friend sticker control.

Figure 3A:
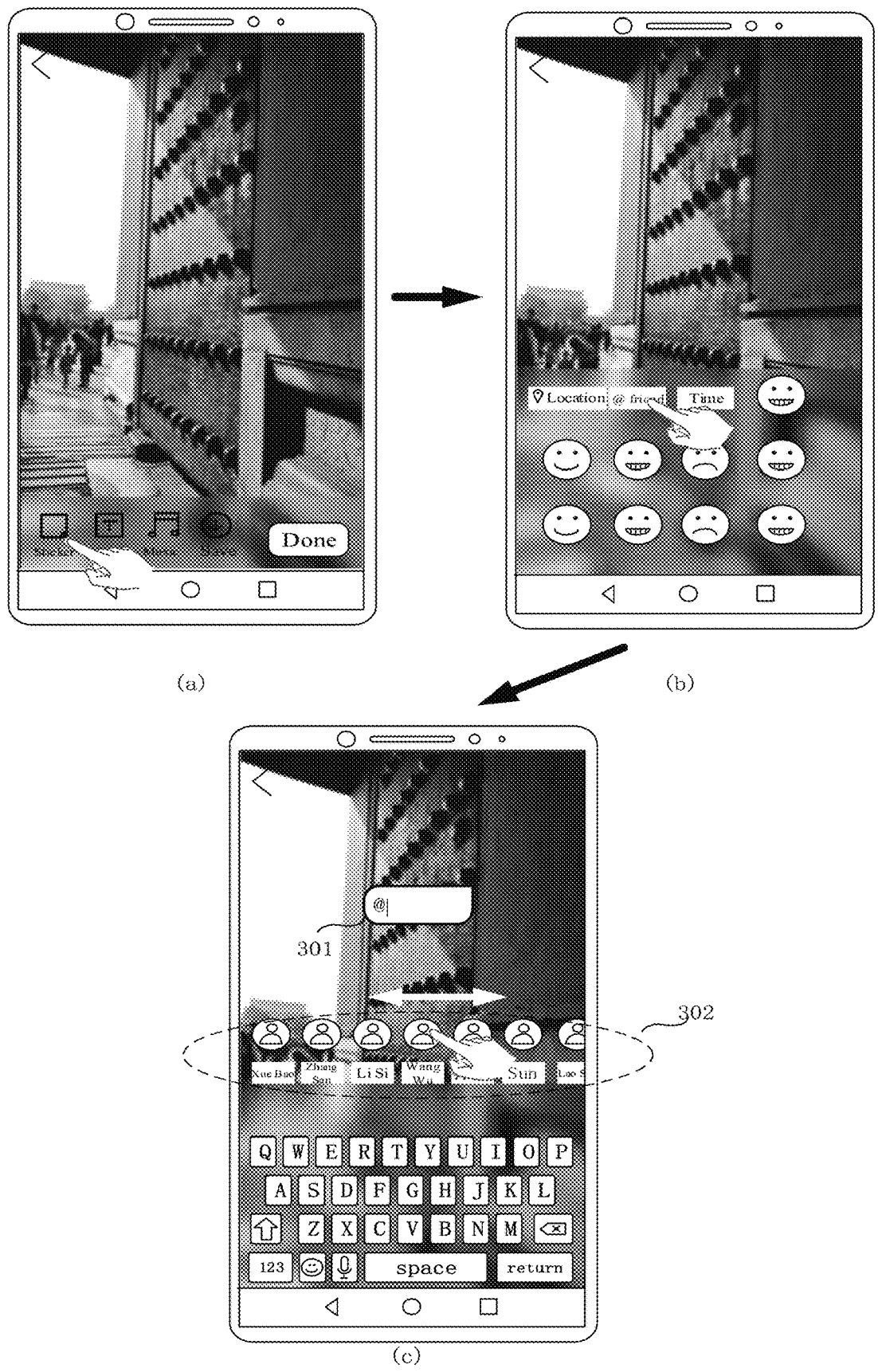
FIG. 3A is a schematic diagram illustrating a set of cell phone display interfaces according to an exemplary embodiment.

Illustratively, when the terminal device is a mobile phone, an implementation effect of each step in the present disclosure will be described below by taking the mobile phone as an example. FIG. 3A (a) illustrates the video editing interface displayed on the mobile phone. The video editing interface is used for editing a video. For example, a sticker may be added to the video, a text may be added to the video, a music may be added to the video, and the video may be saved to a local storage space. For example, the video editing interface illustrated in FIG. 3A (a) includes a sticker control, a text control, a music control, and a save control. When different controls are clicked, the functions of adding the sticker to the video, adding the text to the video, adding the music to the video and storing the video in the local storage space are correspondingly realized. In diagram (a) of FIG. 3A, after the mobile phone detects an operation of clicking the sticker control by the user, as illustrated in diagram (b) of FIG. 3B, the mobile phone may display the sticker panel on the video editing interface. The sticker panel includes the plurality of sticker controls including the friend sticker control. For example, in the diagram (b) in FIG. 3A, the sticker panel includes a location sticker control, an @ friend sticker control, a time sticker control, and a plurality of expression sticker controls. These controls are respectively used for displaying corresponding stickers on the video picture of the video editing interface after being triggered.

For example, the friend sticker control in embodiments of the present disclosure may include the @ friend sticker control in FIG. 3A (b) described above.

At S202a2, the terminal device displays a friend sticker containing the video sharing instruction on the video editing interface in response to a sticker selection operation for the friend sticker control, and displays the friend recommendation list at a preset position.

Specifically, the sticker selection operation for the friend sticker control may include an operation of clicking the friend sticker control. In an embodiment, a friend recommendation position may be displayed at the preset position, and the friend recommendation list is displayed at the friend recommendation position.

For example, as illustrated in FIG. 3A (b), after the user clicks the @ friend control therein, the mobile phone displays the friend sticker containing the video sharing instruction on the video editing interface in response to the operation of clicking the @ friend control by the user.

The video sharing instruction may include a symbol @. For example, after the mobile phone detects the operation of clicking the @ friend control by the user as shown in FIG. 3A (b), the mobile phone displays the friend sticker 301 containing the video sharing instruction as shown in FIG. 3A (c). It can be seen that friend sticker 301 includes the video sharing instruction "@". And the mobile phone also displays the friend recommendation position at the preset position on the video editing interface, and displays the friend recommendation list at the friend recommendation position. Specifically, FIG. 3A (c) includes a plurality of friend recommendation positions 302. And the friend recommendation list is displayed at the friend recommendation positions. Specifically, as illustrated in FIG. 3A (c), the identifications of the sharing objects in the friend recommendation list are displayed at the plurality of friend recommendation positions 302, respectively.

Figure 3B:
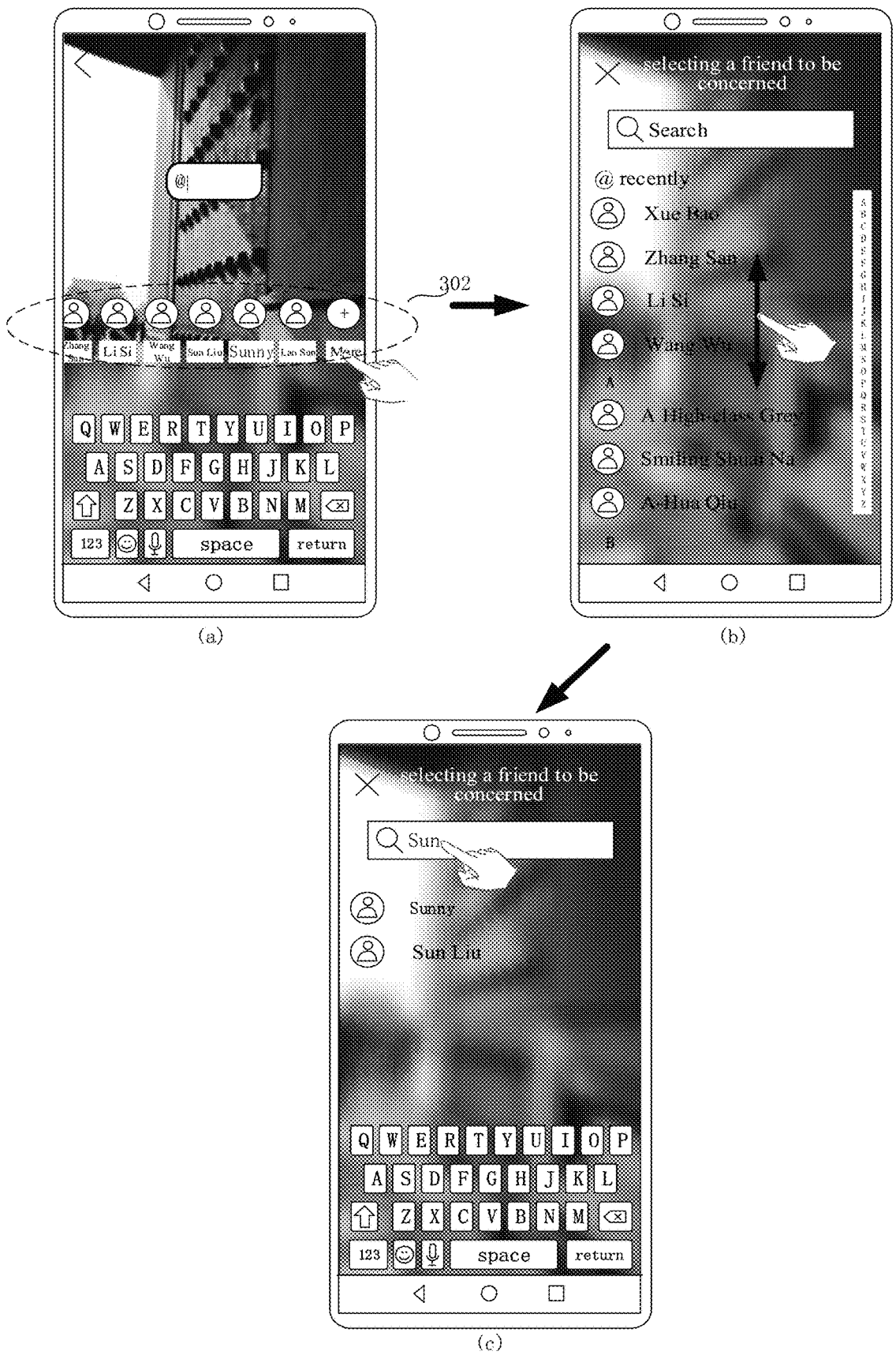
FIG. 3B is a schematic diagram illustrating a set of cell phone display interfaces according to an exemplary embodiment.

In FIG. 3A (c), the user may slide the plurality of friend recommendation positions 302 to left or right to find the sharing object to be selected. Specifically, as illustrated in FIG. 3B (a), when the plurality of friend recommendation positions 302 in the mobile phone are slid to a rightmost side, there is provided one friend recommendation position "more" at the rightmost side. When the user clicks the friend recommendation position "more", a friend menu is displayed on the video editing interface of the mobile phone, as illustrated in FIG. 3B (b). In the friend menu, a prompt of "selecting a friend to be concerned" is written, and the user may select an object that needs to be reminded in the friend menu. In addition, the user may slide the friend menu upwardly or downwardly to check all members in the friend menu. In addition, the user may click one letter in the letter set including letters from A to Z on a right side of the friend menu, and after the mobile phone detects the operation of clicking the letter by the user, the mobile phone displays the member taking the letter as the first letter in the friend menu. In addition, after the user selects a search input box marked with a word "search" in the friend menu, as illustrated in FIG. 3B (c), the user may also input a nickname and/or a remark name of a friend in the search input box, and the mobile phone displays the friend matching with the content input by the user in response to the input operation of the user, so that the user may select the friend.

Figure 3C:
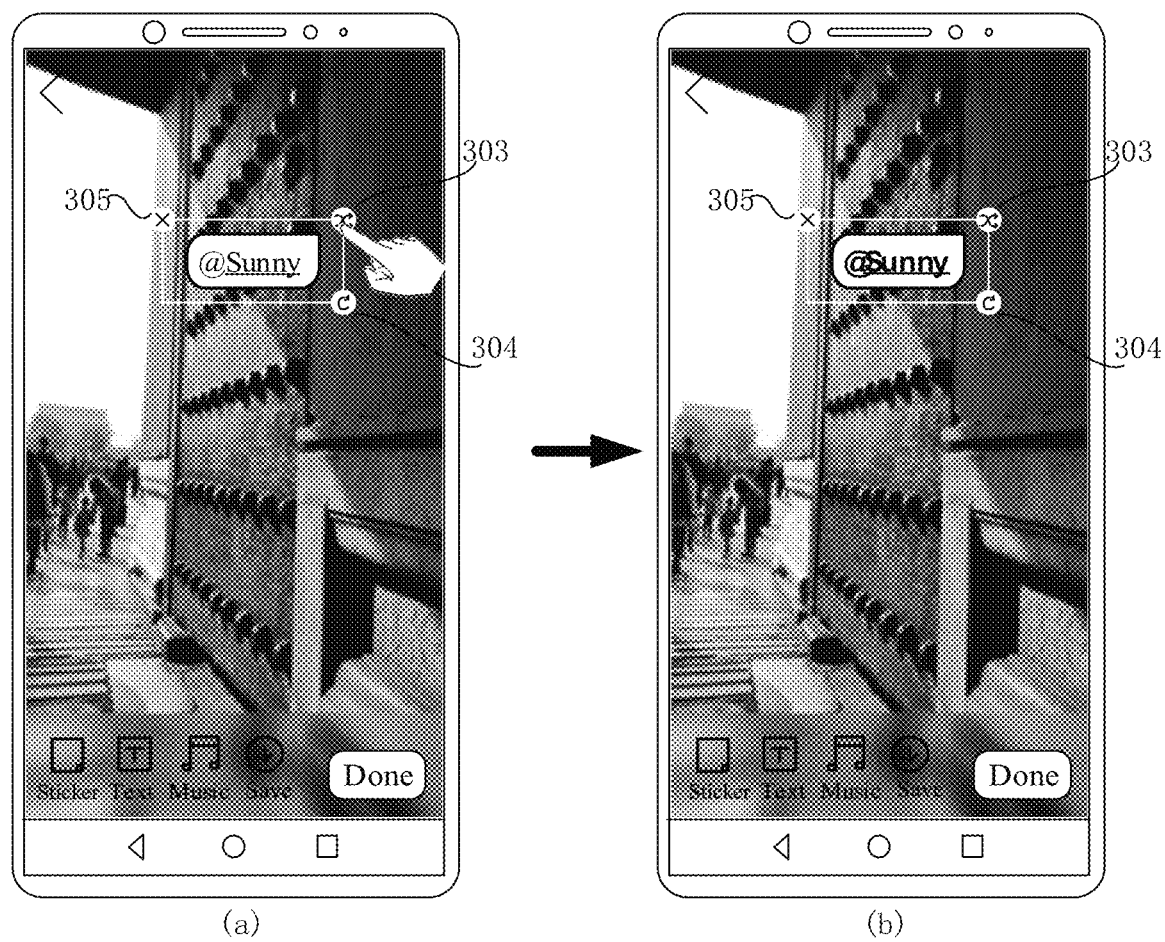
FIG. 3C is a schematic diagram illustrating a set of cell phone display interfaces according to an exemplary embodiment.

For example, as illustrated in FIG. 3C (a), after determining the target sharing object in response to the selection instruction for selecting the sharing object, the identification "Sunny" of the target sharing object may be added to the friend sticker. Furthermore, in a subsequent step, displaying the video data with the reminding mark on the video picture may include displaying the video data of the friend sticker on the video picture.

In one implementation, the video synthesis method further includes: in response to an editing instruction for the friend sticker from the video editing user, editing the friend sticker based on the editing instruction. The editing instruction is used to change a style of the friend sticker, or rotate the friend sticker, or zoom in or out the friend sticker or drag the friend sticker.

Specifically, in the present disclosure, the style, color, size, and the like of the friend sticker on the video editing interface may be edited, so that a visual effect of the friend sticker may better conform to the preference of the user.

Specifically, in the present disclosure, a plurality of editing controls may be disposed outside the friend sticker on the video editing interface, and the plurality of editing controls are respectively used to implement an effect of changing the style of the friend sticker, or rotating the friend sticker, or zooming in or out the friend sticker or dragging the friend sticker.

For example, as illustrated in FIG. 3C(a), on the video editing interface of the mobile phone, there are provided a first control 303, a second control 304, and a third control 305, respectively on the outside of the friend sticker. When the mobile phone detects an operation of clicking the first control 303 by the user, as illustrated in FIG. 3C (b), the style of the identification "Sunny" in the friend sticker is changed. Here, changing the style of the identification "Sunny" specifically refers to changing the font of the identification "Sunny". In some implementations, the color, size, and shape of the friend sticker of the identification "Sunny" may also be changed.

In another feasible implementation, based on the video synthesis method of the embodiment, the video sharing instruction may be generated by using a process of inputting text in the text input box on the video editing interface, so as to trigger the step S202 of obtaining and displaying the friend recommendation list of the video editing user in response to the video sharing instruction from the video editing user. Based on the above consideration, as illustrated in FIG. 2D, the step S202 specifically includes the following steps S202b1-S202b2.

At S202b1, in response to a text input operation on the video editing interface, the text input box is displayed on the video editing interface.

Specifically, the text input operation on the video editing interface may include a long press operation of the user on the video editing interface.

Figure 3D:
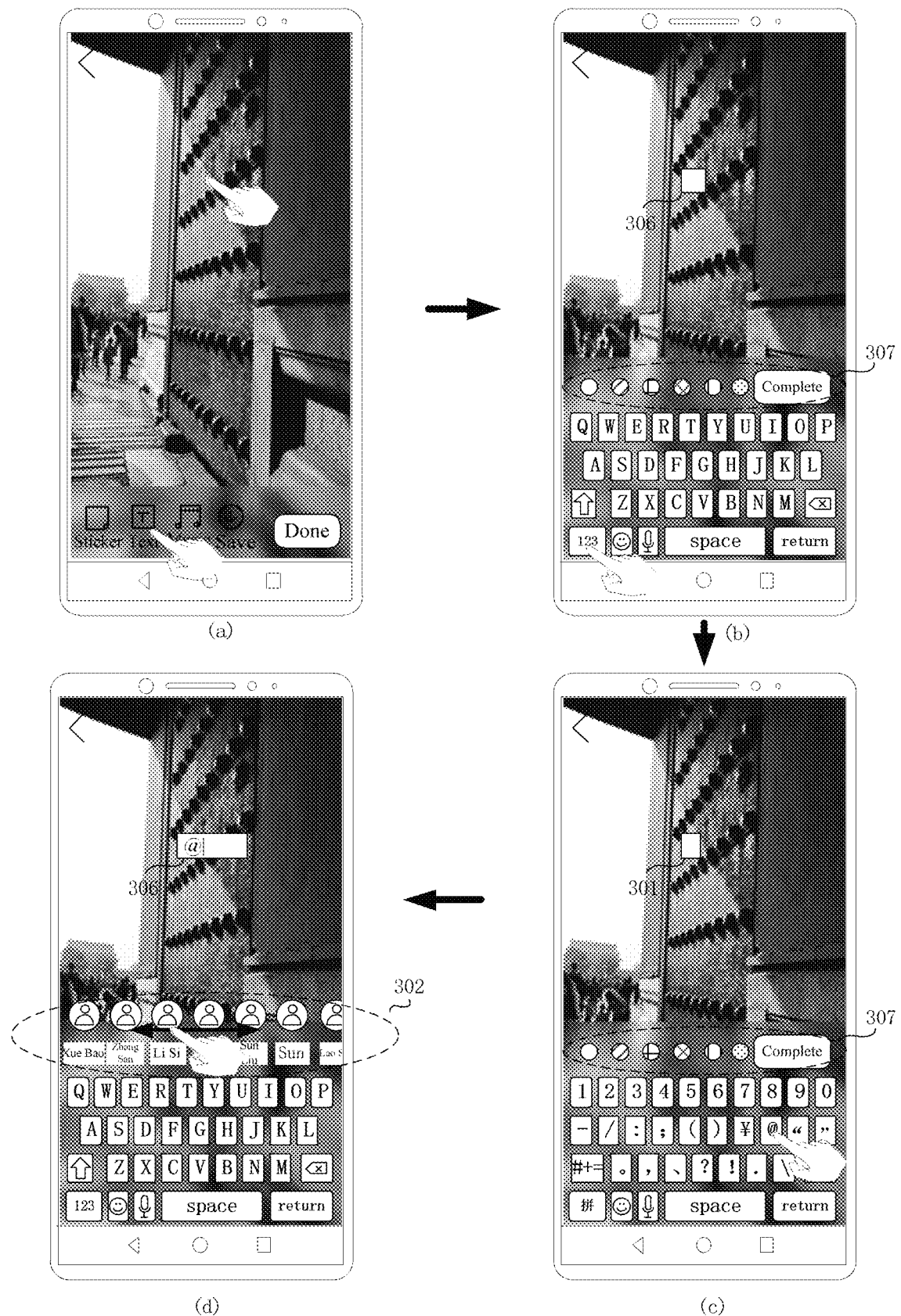
FIG. 3D is a schematic diagram illustrating a set of cell phone display interfaces according to an exemplary embodiment.

For example, FIG. 3D (a) shows the video editing interface displayed on the mobile phone. The video editing interface is used for editing videos. For example, a sticker may be added to the video, a text may be added to the video, a music may be added to the video, and the video may be saved to a local storage space. For example, the video editing interface illustrated in FIG. 3D (a) includes the "sticker" control, the "text" control, the "music" control, and the "save" control. When the different controls are clicked, the functions of adding the sticker to the video, adding the text to the video, adding the music to the video and storing the video in the local storage space are correspondingly realized. In FIG. 3D (a), after the mobile phone detects the operation of long pressing the target position on the video picture by the user, as illustrated in FIG. 3D (b), the mobile phone may display the text input box 306 at the target position long pressed by the user.

Or, when the text control is included in the video editing interface, the text input operation includes the selection operation for the text control.

For example, in FIG. 3D (a), when the user clicks the "text" control, as illustrated in FIG. 3D (b), the mobile phone may display the text input box 306 at the target position.

In addition, it should be noted that, in the above embodiment, the reminding mark position determining instruction at step S204 may also include the operation that the user long presses the target position on the video picture, so as to determine the target position of the reminding mark on the video picture. Of course, in some scenarios, when the text input box 306 includes the identification of the target sharing object, the reminder mark may specifically include the content in the text input box 306.

At S202b2, in response to the video sharing instruction input in the text input box, the friend recommendation list is displayed at the preset position on the video editing interface. In an embodiment, a friend recommendation position may be displayed at the preset position, and the friend recommendation list is displayed at the friend recommendation position.

Specifically, the video sharing instruction may be a symbol "@".

For example, after the terminal device displays the text input box on the video editing interface, a keyboard for receiving a user input may also be displayed on the video editing interface, as illustrated in FIG. 3D (b). At this time, the user may input information such as characters and symbols into the text input box 306 through the keyboard. In addition, a preset video editing item 307 is also displayed above the keyboard. Specifically, the preset video editing item 307 includes a plurality of circular controls for determining a color of information in the text input box 306. Each circular control corresponds to a color (it should be noted that, in FIG. 3D (b), different shades in the plurality of circular controls are used to represent different colors, and in the following figures, the colors are also distinguished in this way, which will not elaborated below), and when the user clicks one of the circular controls, the information in the text input box 306 changes to the corresponding color. Then, in FIG. 3D (b), the user clicks the "123" control in the keyboard, and may switch the keyboard.

After the mobile phone receives the operation of clicking the "123" control in FIG. 3D (b) by the user, the shape of the keyboard on the video editing interface displayed by the mobile phone is illustrated in FIG. 3D (c).

In FIG. 3D (c), after the user clicks the "@" control in the keyboard on the video editing interface, the friend recommendation list is displayed on the video editing interface displayed by the mobile phone. The friend recommendation list is used for indicating a plurality of sharing objects. Specifically, the friend recommendation list may include identifications of the plurality of sharing objects. Specifically, the identification includes a head portrait, a nickname, the remark name, and the like.

In one implementation, a friend recommendation position is displayed at a preset position on the video editing interface displayed by the mobile phone. And the friend recommendation position is used for displaying the friend recommendation list. For example, in FIG. 3D(c), after the user clicks the "@" control, the video editing interface displayed by the mobile phone is illustrated in FIG. 3D (d). The friend recommendation positions 302 are included. With regard to a function and a use mode of the friend recommendation positions 302 and the description of the "more" control in the friend recommendation positions 302, reference may be made to the above description of the friend recommendation positions 302, which are not elaborated here.

In one implementation, in order to fully utilize display resources of the terminal device, when the friend recommendation list is displayed, the preset position for displaying the preset video editing item may be used to display the friend recommendation list. Specifically, before the video sharing instruction input via the text input box 306 is received, the preset video editing item is displayed at the preset position on the video editing interface, and the preset video editing item, when selected, is used for correspondingly editing the video. Further, at step S201b2, in response to the video sharing instruction input by the video editing user in the text input box, displaying the friend recommendation position on the video editing interface may include: in response to the video sharing instruction input by the video editing user in the text input box, displaying the friend recommendation list instead of the preset video editing item at the preset position on the video editing interface.

For example, in FIG. 3D (c), the preset video editing item 307 is displayed at the preset position on the video editing interface displayed by the mobile phone. Then, when the mobile phone detects the operation that the user clicks the video sharing instruction "@" on the keyboard, the interface illustrated in FIG. 3D (d) is further displayed. The friend recommendation list 302 instead of the preset video editing item 307 is displayed at the preset position on the video editing interface.

In some embodiments, in the present disclosure, the friend recommendation list includes the identification of a user with whom the video is shared by the video editing user within a preset time period.

In some embodiments, in response to that a number of the identifications in the friend recommendation list is less than or equal to a number N of the friend recommendation positions, all the identifications in the friend recommendation list are displayed at the friend recommendation positions, N is a positive integer greater than or equal to 1.

In some embodiments, in response to that the number of the identifications in the friend recommendation list is larger than the number of the friend recommendation positions, first N−1 identifications in the friend recommendation list are displayed at first N−1 friend recommendation positions, and remaining identifications behind the first N−1 identifications in the friend recommendation list are displayed when a last friend recommendation position is triggered.

For example, assuming that N is 8, on the video editing interface, there are at most 8 friend recommendation positions for displaying the identifications included in the friend recommendation list. When the number of the identifications in the friend recommendation list is less than 8 (including 8), the identifications may be completely displayed at the friend recommendation positions. And when the number of the identifications in the friend recommendation list exceeds 8, the first 7 friend recommendation positions are used for displaying the identifications in the friend recommendation list. And the 8$^{th}$ friend recommendation position may be triggered to display another window, and the remaining identifications other than the first 7 identifications are displayed in the window.

For example, in FIG. 3A (c), the user may search for the sharing object to be selected by sliding the friend recommendation positions 302 to left or right. Specifically, when the plurality of friend recommendation positions 302 in the mobile phone are slid to the rightmost side, as illustrated in FIG. 3B (a), there is provided one friend recommendation position "more" at the rightmost side. When the user clicks the friend recommendation position "more", the friend menu is displayed on the video editing interface of the mobile phone, as illustrated in FIG. 3B (b). In the friend menu, the prompt of "selecting a friend to be concerned" is written, and the user may select an object that needs to be reminded in the friend menu. In addition, the user may slide the friend menu upwardly or downwardly to check all members in the friend menu. In addition, the user may click one letter in the letter set including letters from A to Z on a right side of the friend menu, and after the mobile phone detects the operation of clicking the letter by the user, the mobile phone displays the member taking the letter as the first letter in the friend menu. In addition, after the user selects a search input box marked with the word "search" in the friend menu, as illustrated in FIG. 3B (c), the user may also input the nickname and/or the remark name of the friend in the search input box, and the mobile phone displays the friend matching with the content input by the user in response to the input operation of the user, so that the user may select the friend.

In one implementation, the identifications in the friend recommendation list are arranged according to a duration of a time of a shared video to a current time, from the shortest to the longest.

For example, in FIG. 3A (c), among the 7 identifications respectively displayed at the friend recommendation positions 302, "Xue Bao" is the first user with whom the video is shared most frequently by the video editing user, "Zhang San" is the second one, "Li Si" is the third one, and then "Wang Wu" is the fifth one, and so on.

It should be noted that, in the present disclosure, the time of the shared video may include the time when the video editing user shares a forwarded video with the user corresponding to the identification, or may also be the time when the video editing user tags ("@") other users.

Figure 2F:
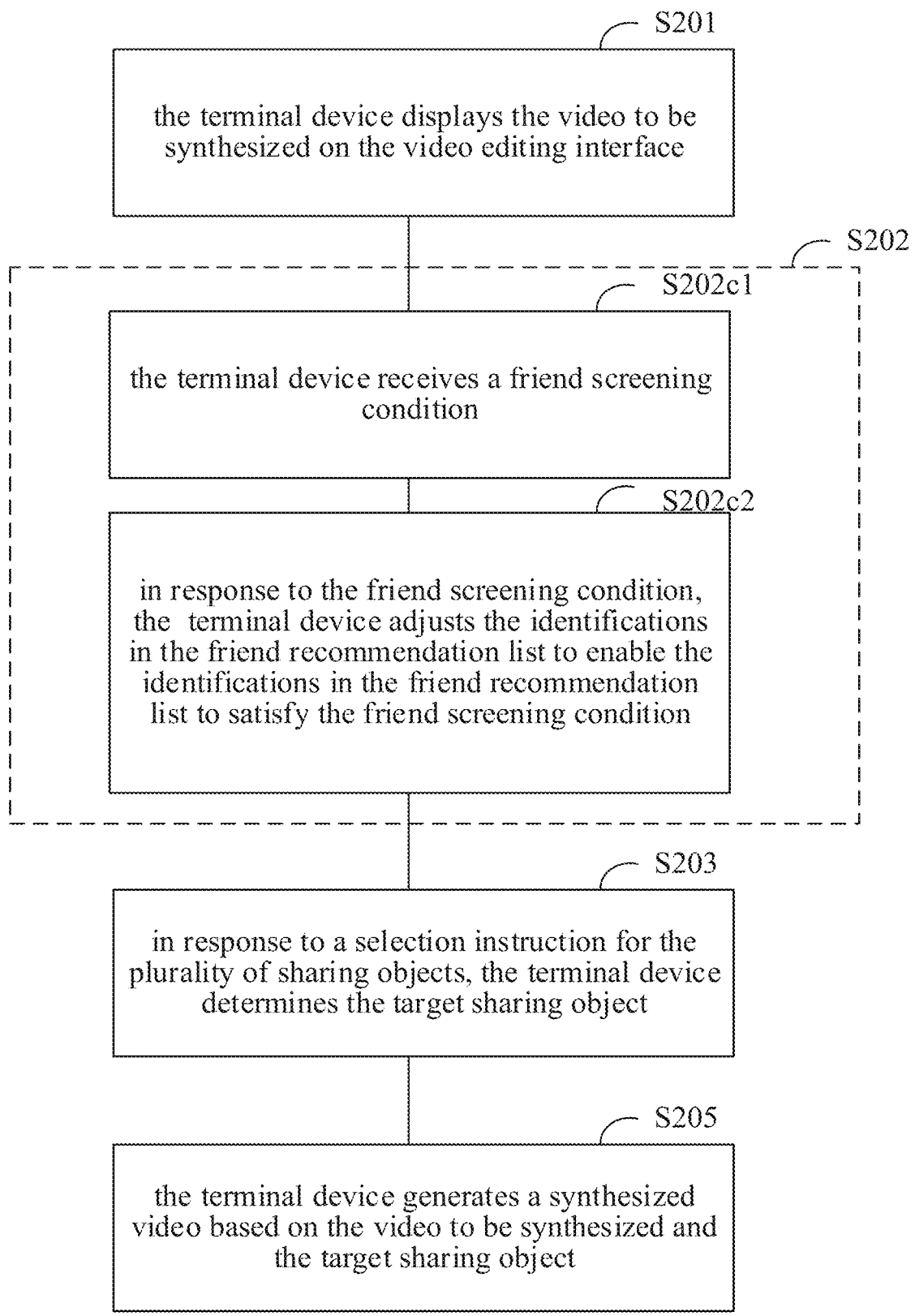
FIG. 2F is a flow diagram illustrating a method for synthesizing a video according to an exemplary embodiment.

In one implementation, as illustrated in FIG. 2F, at step S202, in response to the video sharing instruction from the video editing user, obtaining and displaying the friend recommendation list of the video editing user includes the follows.

At S202c1, a friend screening condition is received.

In an embodiment, the video editing user may input the friend screening condition after the video sharing instruction.

At S202c2, in response to the friend screening condition, the identifications in the friend recommendation list are adjusted to enable the identifications in the friend recommendation list to satisfy the friend screening condition.

Specifically, receiving the friend screening condition input after the video sharing instruction may include inputting the friend screening condition in the friend sticker in the above embodiment.

In addition, receiving the friend screening condition input after the video sharing instruction may further include inputting the friend screening condition in the text input box in the above embodiment.

Figure 3E:
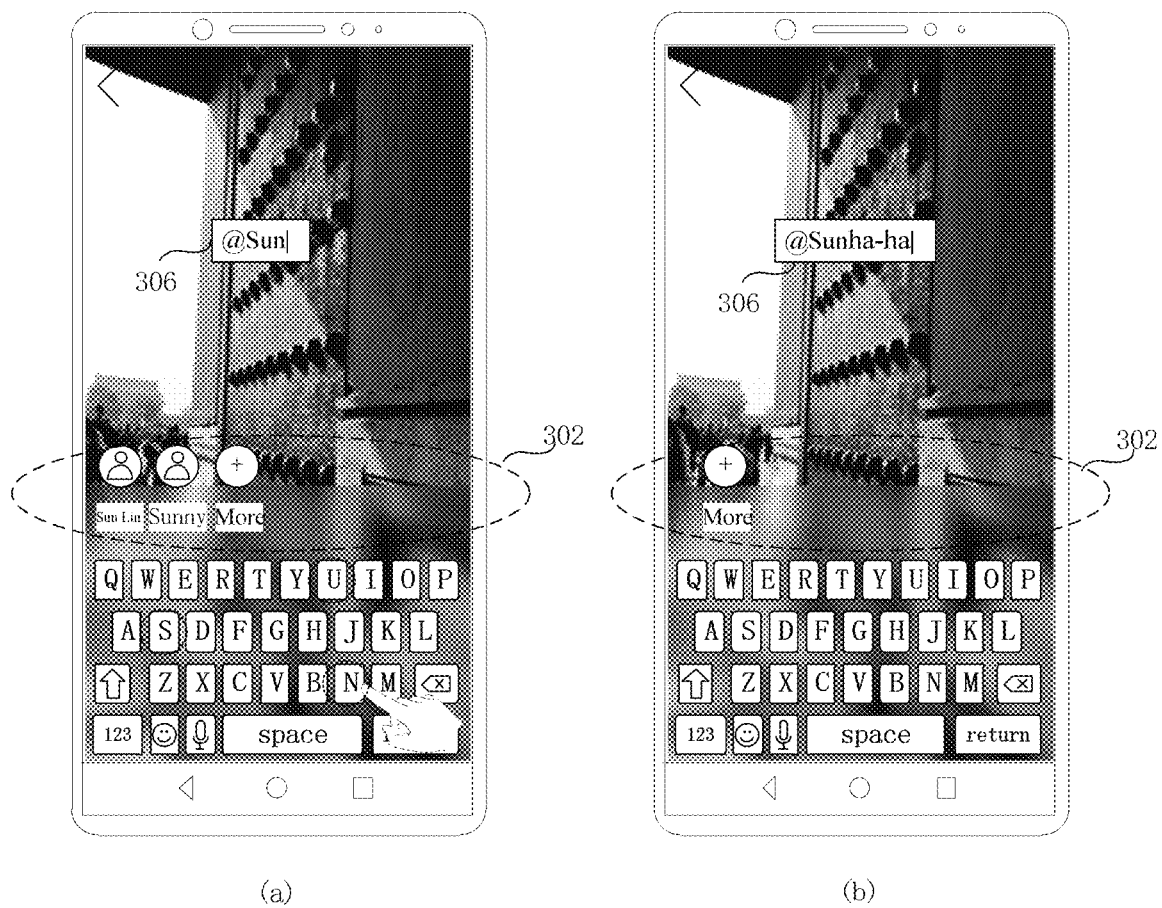
FIG. 3E is a schematic diagram illustrating a set of cell phone display interfaces according to an exemplary embodiment.

Illustratively, as illustrated in FIG. 3E (a), after the user sequentially inputs "S", "u", "n" in the text input box 306, objects having nicknames "Sun Liu" and "Sunny" are displayed at the friend recommendation positions 302.

When the characters input by the user cannot be matched with any reminding object, only the "more" control is displayed at the friend recommendation positions 302, as illustrated in FIG. 3E (b).

Figure 3F:
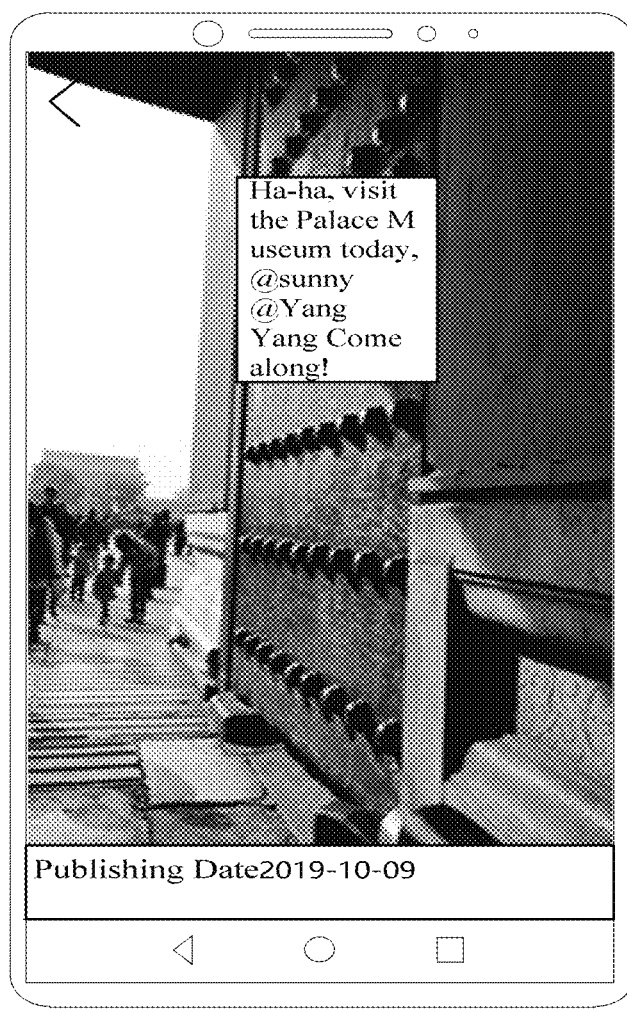
FIG. 3F is a schematic diagram illustrating a cell phone display interface according to an exemplary embodiment.

In one implementation, in the present disclosure, the reminding mark is used to link to a page corresponding to the target sharing object. Illustratively, as illustrated in FIG. 3F, a schematic diagram of a playing interface of a published video is shown. The video picture includes the reminding mark used for indicating the sharing object. Specifically, the reminding mark includes "@ Sunny" and "@ Yang Yang" in the text input box.

When the user watching the video clicks the reminding mark on the video picture, the terminal device displays the page of the sharing object corresponding to the reminding mark. Specifically, the page may be a home page of the sharing object or a profile page in the short video application.

In one implementation, at step S202, before determining the target sharing object in response to the selection instruction from the video editing user for plurality of sharing objects, the method provided by the present disclosure further includes: acquiring the selection instruction for the plurality of sharing objects from the video editing user.

The selection instruction includes the identification for indicating the sharing object and a preset input instruction input after the video sharing instruction, or the selection operation for the identification displayed at the friend recommendation position.

The identification used for indicating the sharing object and the preset input instruction input after the video sharing instruction specifically includes: the identification of the sharing object input in the friend sticker provided in the above embodiment, and the preset input instruction input after the input identification of the sharing object.

Specifically, the preset input instruction may be a space instruction.

Figure 3G:
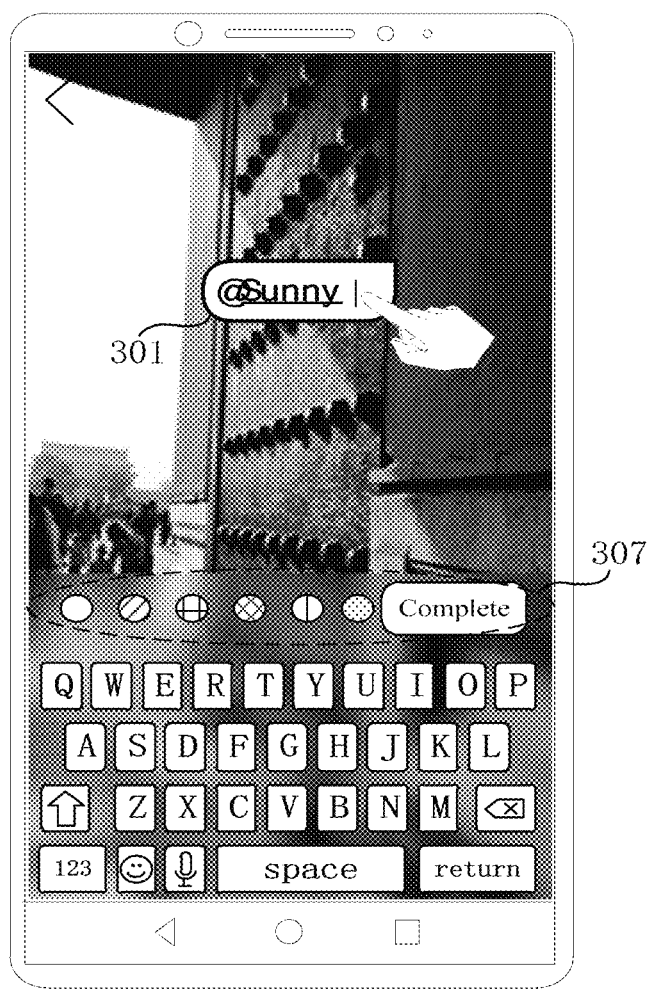
FIG. 3G is a schematic diagram illustrating a cell phone display interface according to an exemplary embodiment.

Illustratively, as illustrated in FIG. 3G, after "Sunny" is entered in the friend sticker 301, a space is entered. A text of "@ Sunny" is displayed in friend sticker 301 indicating that the user with the nickname of Sunny has been selected.

In the present disclosure, in order to distinguish the selected object, after the target sharing object is determined, the present disclosure may further include: displaying the identification of the target sharing object in the friend sticker in a display mode different from that of other input information. Displaying the identification of the target sharing object in the friend sticker in the display mode different from the display mode of other input information may include the follows. The identification of the target sharing object is underlined. For example, "Sunny" in friend sticker 301 in FIG. 3G is underlined.

In another implementation, in the present disclosure, the selection instruction may further include the selection operation for the identification displayed at the friend recommendation position.

Figure 3H:
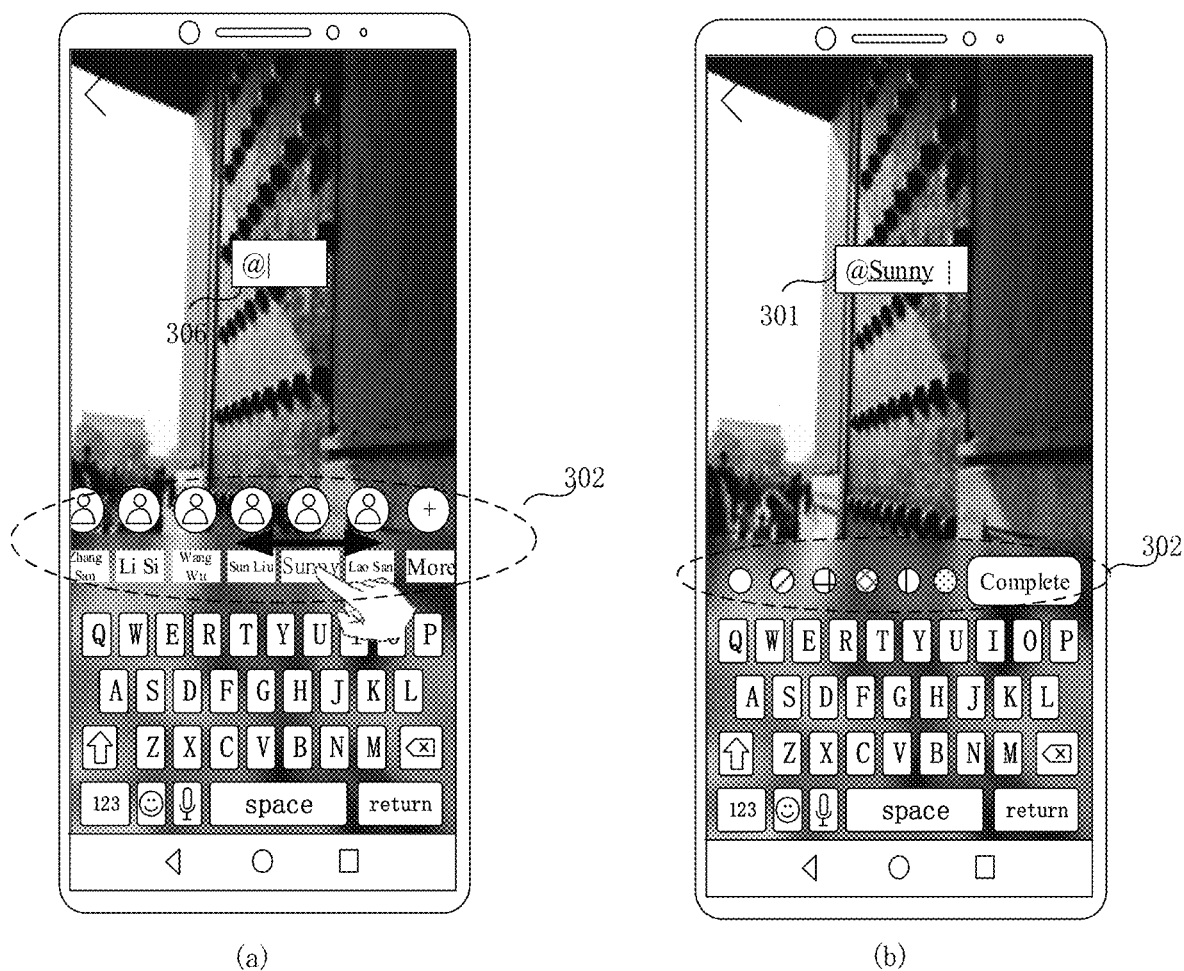
FIG. 3H is a schematic diagram illustrating a set of cell phone display interfaces according to an exemplary embodiment.

For example, in FIG. 3H (a), when the user clicks the identification "Sunny" displayed at the friend recommendation positions 302, the mobile phone also underlines "Sunny" in the text input box 306 in response to the user's click operation, as illustrated in FIG. 3H (b).

In another implementation, in the present disclosure, when information input after the video sharing instruction is not the identification of the sharing object, if the preset input instruction is input, the preset video editing item instead of the friend recommendation list is displayed at the preset position on the video editing interface.

Figure 3I:
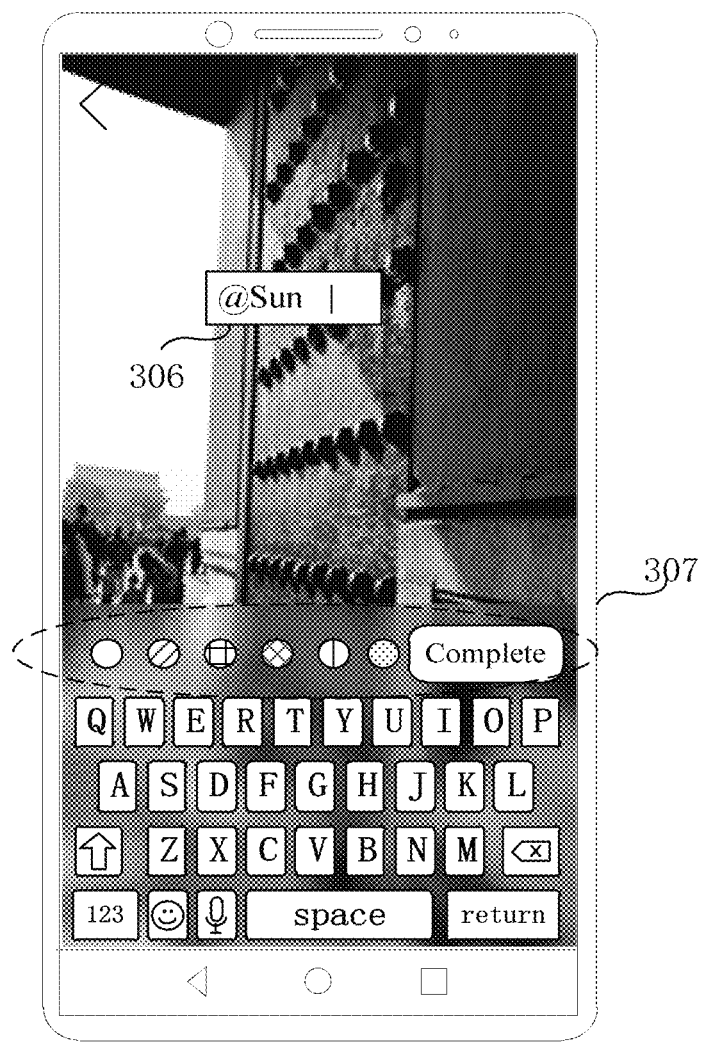
FIG. 3I is a schematic diagram illustrating a cell phone display interface according to an exemplary embodiment.

For example, in FIG. 3I, after the user inputs the video sharing instruction "@" in the text input box 306, the user inputs "S", "u", "n" and two space instructions in sequence. Then as illustrated in FIG. 3I, at the preset position on the video editing interface, the preset video editing item 307 is displayed.

In one implementation, when it is determined that the video editing user publishes video data with the reminding mark displayed on the video picture for the first time, the method provided in the present disclosure further includes: displaying prompting information in response to the identification of the target sharing object displayed in the friend sticker or in response to the identification of the target sharing object displayed in the text input box.

Figure 3J:
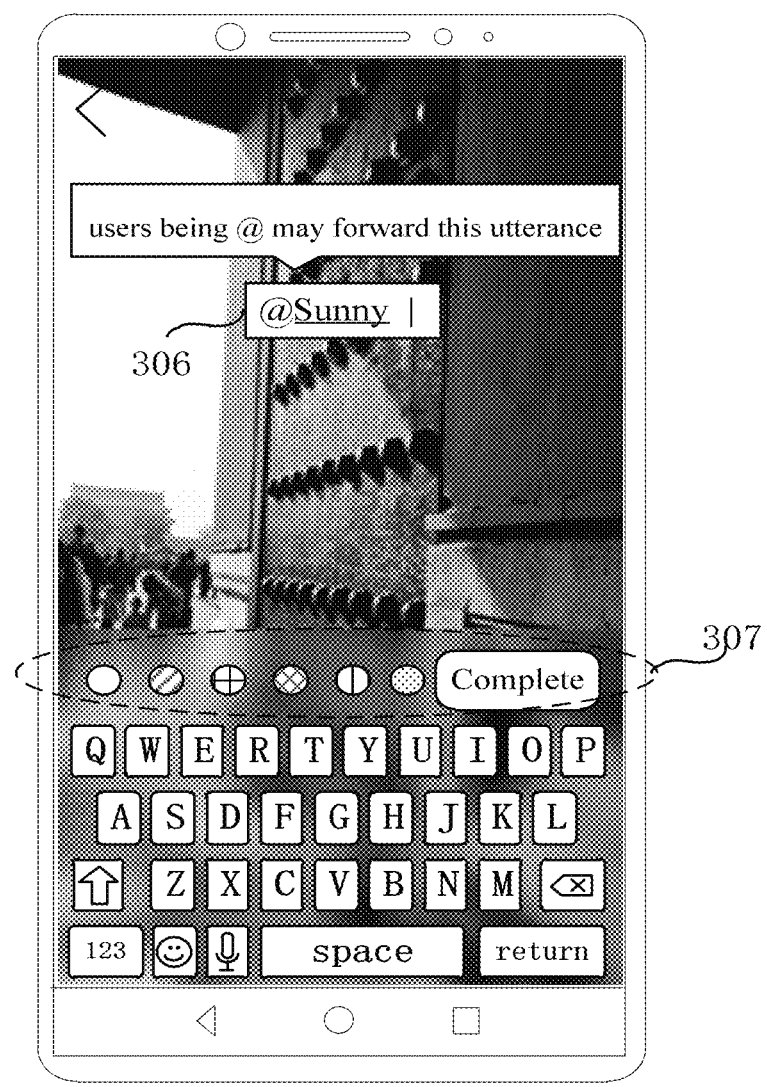
FIG. 3J is a schematic diagram illustrating a cell phone display interface according to an exemplary embodiment.

Illustratively, in FIG. 3J, above the text input box 306, a prompt of "the user being tagged ("@") may forward this utterance" is displayed.

In one implementation, in the present disclosure, the characters in the friend sticker or text input box are smaller in font size as the number of characters is larger.

Figure 3K:
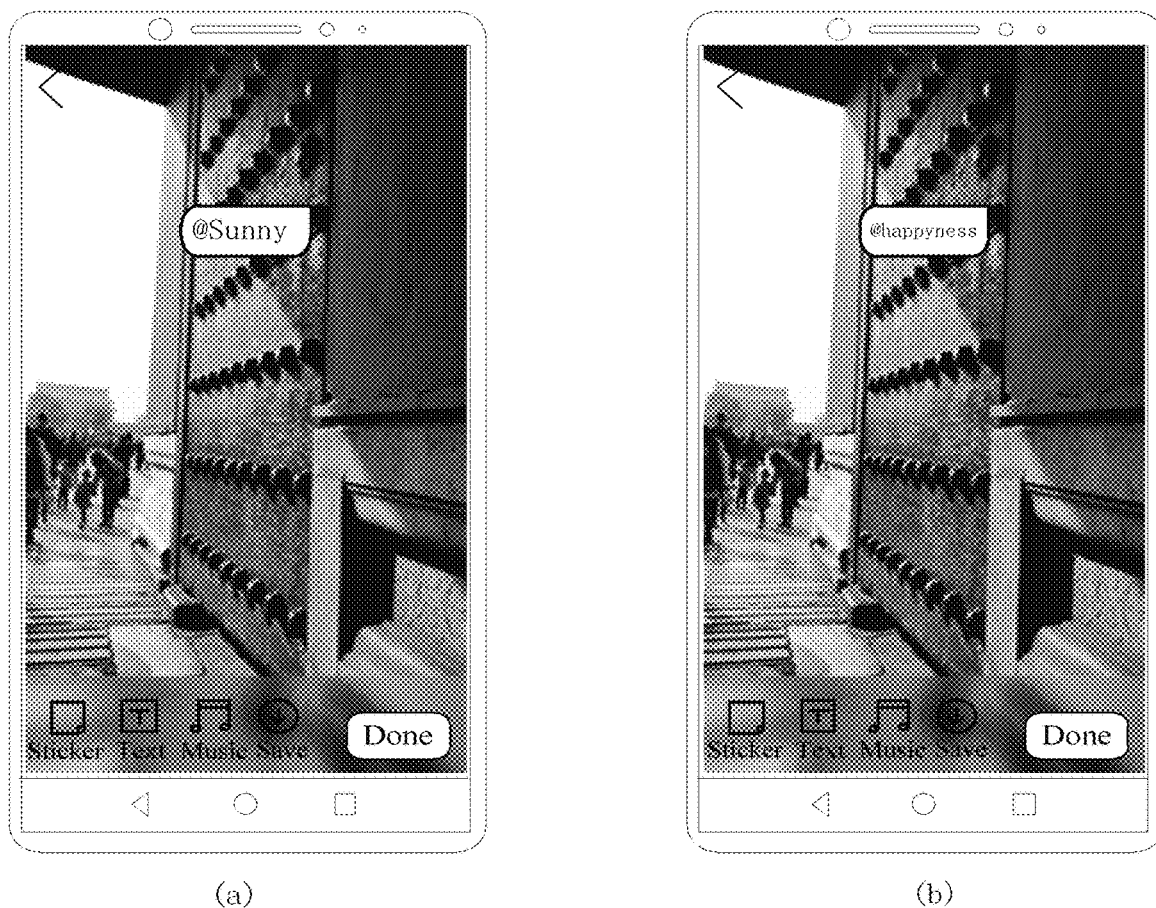
FIG. 3K is a schematic diagram illustrating a set of cell phone display interfaces according to an exemplary embodiment.

Illustratively, as in FIG. 3K, the font of the characters in FIG. 3K (a) is larger than the font of the characters in FIG. 3K (b).

Figure 2G:
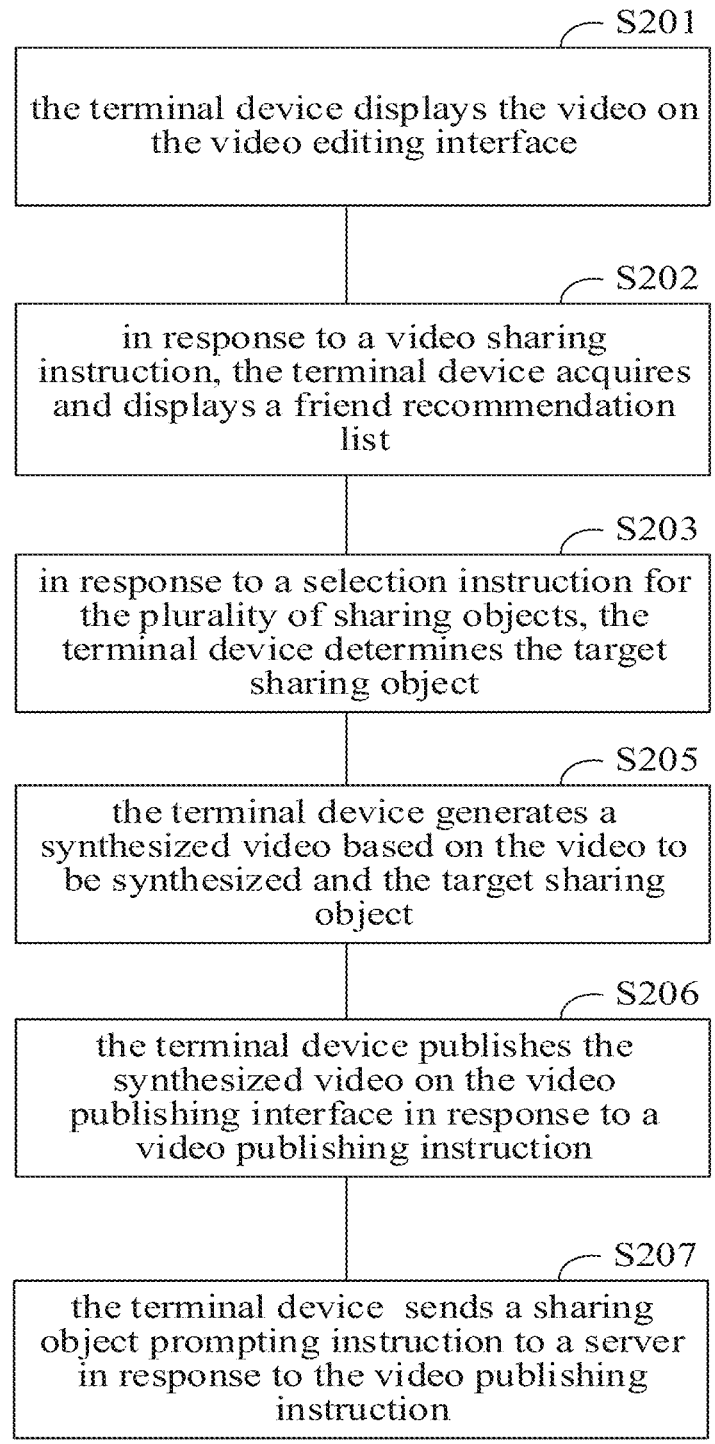
FIG. 2G is a flow diagram illustrating a method for synthesizing a video according to an exemplary embodiment.

In one implementation, as illustrated in FIG. 2G, after the terminal device acquires the video publishing instruction from the video editing user, the method further includes the follows.

At S207, in response to the video publishing instruction, the terminal device sends a sharing object prompting instruction to a server.

The sharing object prompting instruction is used for instructing the server to send prompting information corresponding to the synthesized video to a target terminal device; the target terminal device includes the terminal device corresponding to the target sharing object.

According to the present disclosure, when the synthesized video is published, the sharing object prompting instruction is sent to the server, such that the server sends the prompt information to the target terminal device. Therefore, the target terminal device outputs corresponding information after receiving the prompt information, so that the user of the target terminal device may timely know that the synthesized video published by the video editing user has the reminding mark mentioning the user.

For example, the target terminal device may display the prompting information in the form of "* has @ you in the utterance" on the display interface after receiving the prompting information from the server, so as to achieve the effect of prompting the user. The field "*" may be the identification such as the nickname, the remark name, or the like of the video editing user.

In addition, after the target terminal device displays the prompting information on the display interface, the target terminal device may also execute a task of forwarding the synthesized video when receiving an operation that the user clicks the prompting information on the display interface.

Specifically, after receiving the operation of clicking the prompting information on the display interface by the user, in response to the operation of clicking the prompting information on the display interface by the user, the target terminal device displays the video editing interface of the synthesized video. On the video editing interface, the target terminal device may correspondingly edit the synthesized video according to an operation instruction from the user, and may also modify the reminding mark on the video picture of the synthesized video, or add another reminding mark, or the like. After the editing of the synthesized video is completed, the target terminal device may also publish the synthesized video after the editing.

When the target terminal device publishes the synthesized video after the editing, the target sharing object may be considered as a publisher of the synthesized video after the editing. For example, when the target terminal device publishes the synthesized video after the editing, the synthesized video after the editing is published as a work of the target sharing object, and the synthesized video after the editing is displayed in a work column of the target sharing object.

Specifically, with regard to the steps of modifying the reminding mark on the video picture of the synthesized video, adding other reminding marks, and publishing the synthesized video after the editing, reference may be made to the contents of steps S201 to S206.

In the prior art, when the video is published, if the certain sharing object (for example, the friend of the video editing user) is to be reminded to watch the video, it is only possible to add the text for reminding the sharing object on the video publishing interface (for example, the text of @ friend is input on the video publishing interface), so that when the video is played, the information for reminding the sharing object may only be displayed at the preset text display position. In the video synthesis method provided by the present disclosure, in the process of editing the displayed video to be synthesized on the video editing interface, after the video sharing instruction (for example, a symbol "@" is received) is received, the friend recommendation list of the video editing user is obtained in response to the video sharing instruction, and then the target sharing object is determined in response to the selection instruction. And the reminding mark is displayed on the video picture by generating the synthesized video with the reminding mark displayed on the video picture. Compared with the method of adding the reminding mark on the video publishing interface in the prior art, the video synthesis method provided by the present disclosure adds the reminding mark on the video editing interface, and further adds the reminding mark into the video picture, so that the way of reminding the sharing object is enriched, and the user experience is improved.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

Embodiment 2

Figure 4:
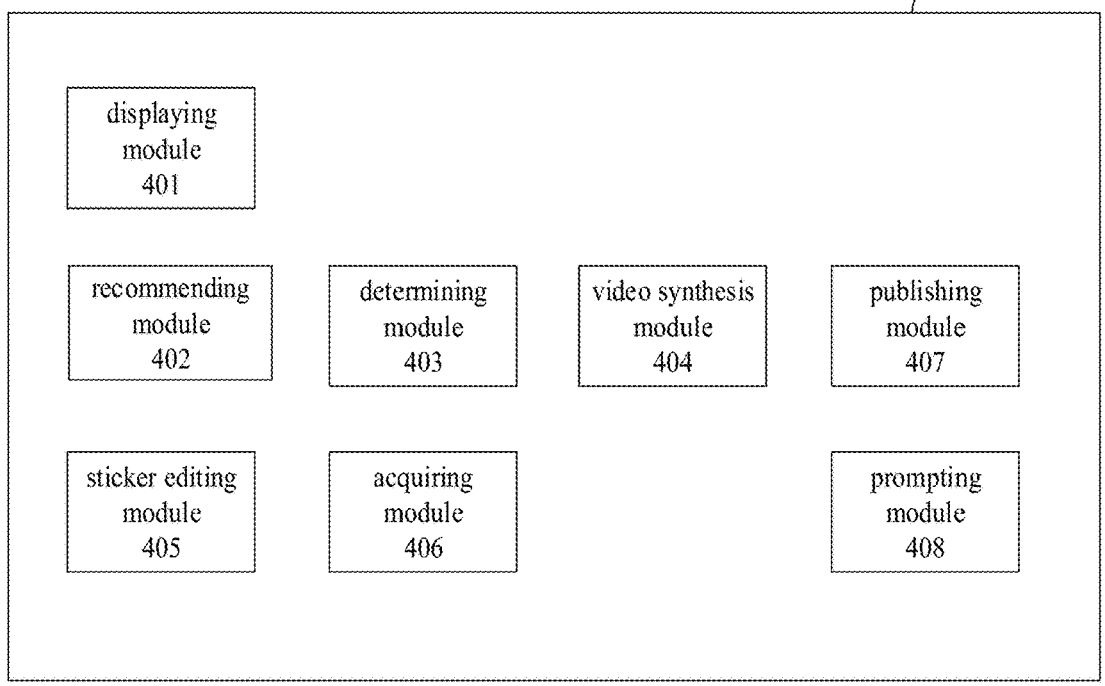
FIG. 4 is a block diagram illustrating an apparatus for synthesizing a video according to an exemplary embodiment.

FIG. 4 is a schematic diagram illustrating an apparatus for synthesizing a video according to an exemplary embodiment. Specifically, the apparatus may be a terminal device. Referring to FIG. 14, the apparatus 40 includes a displaying module 401, a recommending module 402, a determining module 403 and a video synthesis module 404.

The displaying module 401 is configured to display a video to be synthesized on a video editing interface.

The recommending module 402 is configured to acquire and display a friend recommendation list in response to a video sharing instruction. The friend recommendation list is used for indicating a plurality of sharing objects.

The determining module 403 is configured to determine a target sharing object in response to a selection instruction for the plurality of sharing objects.

The video synthesis module 404 is configured to generate a synthesized video based on the video to be synthesized and the target sharing object. A reminding mark for indicating the target sharing object is displayed on a video picture of the synthesized video.

In some embodiments, the video editing interface includes a sticker control.

The recommending module 402 is configured to display a sticker panel in response to a selection operation for the sticker control on the video editing interface. The sticker panel includes a plurality of sticker controls containing a friend sticker control.

The recommending module 402 is configured to display a friend sticker including the video sharing instruction on the video editing interface and display the friend recommendation list at a preset position on the video editing interface in response to a sticker selection operation for the friend sticker control.

In some embodiments, the apparatus further includes a sticker editing module 405.

The sticker editing module 405 is configured to edit the friend sticker in response to an editing instruction for the friend sticker. The editing instruction is used to change a style of the friend sticker, or rotate the friend sticker, or zoom in or out the friend sticker or drag the friend sticker.

In some embodiments, the recommending module 402 is configured to display a text input box on the video editing interface, in response to a text input operation on the video editing interface.

The recommending module 402 is configured to display the friend recommendation list at a preset position on the video editing interface in response to the video sharing instruction input in the text input box.

In some embodiments, the displaying module 401 is further configured to before the video sharing instruction input by the video editing user in the text input box is received, display a preset video editing item at the preset position on the video editing interface. The preset video editing item is used for editing the video to be synthesized when selected.

The recommending module 402 is configured to display the friend recommendation list instead of the preset video editing item in response to the video sharing instruction input in the text input box.

In some embodiments, the text input operation on the video editing interface includes a long press operation on the video editing interface; or, the video editing interface includes a text control, and the text input operation on the video editing interface includes a selection operation for the text control.

In some embodiments, the friend recommendation list includes an identification of a user with whom a video is shared by the video editing user within a preset time period; the recommending module 402 is configured to displaying all identifications in the friend recommendation list at the preset positions in response to that a number of the identifications in the friend recommendation list is less than or equal to a number N of the preset positions, in which N is a positive integer greater than or equal to 1; the recommending module 402 is configured to displaying first N−1 identifications in the friend recommendation list at first N−1 preset positions and displaying remaining identifications behind the first N−1 identifications when a last preset position is triggered, in response to that the number of the identifications in the friend recommendation list is larger than the number of the preset positions.

In some embodiments, the identifications in the friend recommendation list are arranged according to a duration of a time when a shared video is shared to a current time, from the shortest to the longest.

In some embodiments, the recommending module 402 is configured to receive a friend screening condition; the recommending module 402 is further configured to adjust the identifications in the friend recommendation list to enable the identifications in the friend recommendation list to satisfy the friend screening condition.

In some embodiments, the reminding mark is used for linking to a page corresponding to the target sharing object.

In some embodiments, the apparatus further includes an acquiring module.

The acquiring module 406 is configured to, before the target sharing object is determined in response to the selection instruction for the plurality of sharing objects from the video editing user, acquire the selection instruction for the plurality of sharing objects from the video editing user; the selection instruction for the plurality of sharing objects includes a preset input instruction of inputting an identification for indicting a sharing object, or, the selection instruction for the plurality of sharing objects includes a selection operation for an identification displayed at the friend recommendation position.

In some embodiments, the apparatus 40 further includes a publishing module 407.

The publishing module 407 is configured to, after the synthesized video is generated based on the video to be synthesized and the target sharing object, publish the synthesized video on a video publishing interface in response to a video publishing instruction.

In some embodiments, the apparatus 40 further includes a prompting module 408.

The prompting module 408 is configured to, send a sharing object prompting instruction to a server in response to the video publishing instruction; in which the sharing object prompting instruction is used for instructing the server to send prompting information corresponding to the synthesized video to a target terminal device; the target terminal device includes a terminal device corresponding to the target sharing object.

With regard to the apparatus in the above embodiment, the specific manner in which each module performs the operation has been described in detail in the embodiment related to the method, which will not be elaborated here.

Figure 5:
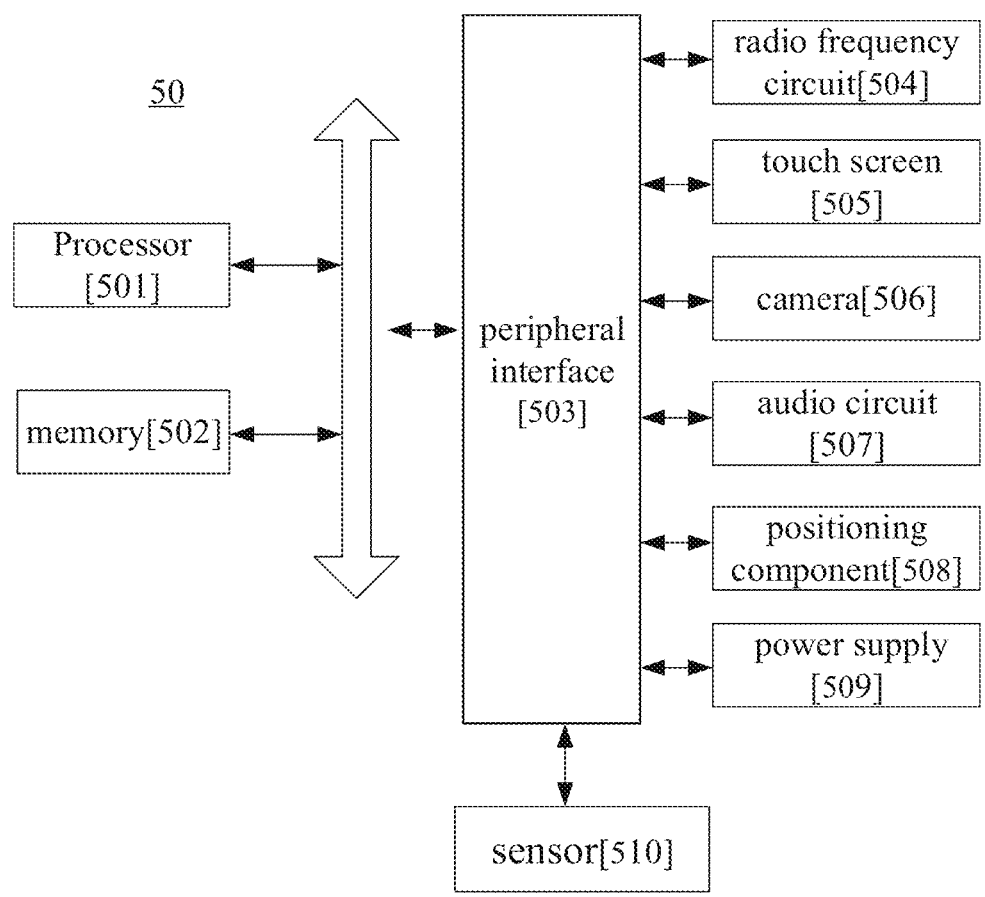
FIG. 5 is a schematic diagram illustrating an apparatus for synthesizing a video according to an exemplary embodiment.

When the video synthesis apparatus is the terminal device, FIG.5 is a possible schematic diagram illustrating the video synthesis apparatus according to the above embodiment. As illustrated in FIG. 5, the video synthesis device 50 includes a processor 501 and a memory 502.

It is understood that, the video synthesis device 50 illustrated in FIG. 50 may implement all of the functions of the video synthesis apparatus 40 described above. The functions of the respective modules in the video synthesis apparatus 40 described above may be implemented in the processor 501 of the video synthesis device 50. The memory module of the video synthesis apparatus 40 corresponds to the memory 502 of the video synthesis device 50.

The processor 501 may include one or more processing cores, such as a 4-core processor, an 8-core processor, and the like. The processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), and the like. The different processing units may be independent devices or may be integrated in one or more processors.

The memory 502 may include one or more computer readable storage mediums, which may be non-transitory. The memory 502 may also include a high-speed random access memory, as well as a non-volatile memory, such as one or more magnetic disk storage devices, flash memory storage devices. In some embodiments, the non-transitory computer readable storage medium in memory 502 is used to store at least one instruction for executing by processor 501 to implement the video synthesis method provided by the method embodiments of the present disclosure.

In some embodiments, the video synthesis device 50 may also optionally include a peripheral interface 503 and at least one peripheral device. The processor 501, the memory 502, and the peripheral interface 503 may be connected by a bus or a signal line. Various peripheral devices may be connected to the peripheral interface 503 via the bus, the signal line, or a circuit board. Specifically, the peripheral device includes at least one of a radio frequency circuit 504, a touch screen 505, a camera 506, an audio circuit 507, a positioning component 508, and a power supply 509.

The peripheral interface 503 may be used to connect at least one peripheral device related to I/O (Input/Output) to the processor 501 and the memory 502. In some embodiments, the processor 501, the memory 502, and the peripheral interface 503 are integrated on a same chip or circuit board; in some other embodiments, any one or two of the processor 501, the memory 502, and the peripheral interface 503 may be implemented on individual chips or circuit boards, which is not limited in this embodiment.

The radio frequency circuit 504 is used to receive and transmit RF (Radio Frequency) signals, also called electromagnetic signals. The radio frequency circuit 504 communicates with communication networks and other communication devices via electromagnetic signals. The radio frequency circuit 504 converts an electrical signal into an electromagnetic signal for transmission, or converts the received electromagnetic signal into the electrical signal. Optionally, the radio frequency circuit 404 includes an antenna system, an RF transceiver, one or more amplifiers, a tuner, an oscillator, a digital signal processor, a codec chipset, a subscriber identity module card, and the like. The radio frequency circuit 504 may communicate with other video synthesis devices via at least one wireless communication protocol. The wireless communication protocols include, but are not limited to a metropolitan area network, various generation mobile communication networks (2G, 3G, 4G, and 5G), a wireless local area network, and/or a Wi-Fi (Wireless Fidelity) network. In some embodiments, the radio frequency circuit 504 may further include NFC (Near Field Communication) related circuits, which are not limited in the present disclosure.

The display screen 505 is used to display a UI (User Interface). The UI may include a graphic, a text, an icon, a video, and any combination thereof. When the display screen 505 is a touch display screen, the display screen 505 also has an ability to capture touch signals on or over a surface of the display screen 505. The touch signal may be input to the processor 501 as a control signal for processing. At this point, the display screen 505 may also be used to provide virtual buttons and/or a virtual keyboard, also referred to as soft buttons and/or a soft keyboard. In some embodiments, the display screen 505 may be one front panel for setting the video synthesis device 50; the display screen 505 may be made of LCD (Liquid Crystal Display), OLED (Organic Light-Emitting Diode), and other materials.

The camera assembly 506 is used to capture images or videos. Optionally, the camera assembly 506 includes a front camera and a rear camera. Generally, the front camera is disposed on the front panel of the video synthesis device, and the rear camera is disposed on a rear surface of the video synthesis device. The audio circuit 507 may include a microphone and a speaker. The microphone is used for collecting sound waves of the user and the environment, converting the sound waves into electric signals, and inputting the electric signals to the processor 501 for processing or inputting the electric signals to the radio frequency circuit 404 for realizing voice communication. For a purpose of stereo sound capture or noise reduction, a plurality of microphones may be provided at different portions of the video synthesis device 50, respectively. The microphone may also be an array microphone or an omni-directional acquisition microphone. The speaker is used to convert the electrical signals from the processor 501 or the radio frequency circuit 504 into the sound waves. The loudspeaker can be a traditional film loudspeaker and can also be a piezoelectric ceramic loudspeaker. When the speaker is the piezoelectric ceramic speaker, the speaker can be used for purposes such as converting the electric signals into the sound wave audible to a human being, or converting the electric signals into the sound wave inaudible to the human being to measure a distance. In some embodiments, the audio circuit 507 may also include a headphone jack.

The positioning component 508 is used to locate the current geographic location of the video synthesis device 50 to implement navigation or LBS (Location Based Service). The Positioning component 508 may be a positioning component based on the Global Positioning System (GPS) in the United States, the Beidou System in China, the Grignard System in Russia, or the Galileo System in the European Union.

A power supply 509 is used to power various components in the video synthesis device 50. The power supply 509 may be an alternating current power source, a direct current power source, a disposable battery or a rechargeable battery. When power supply 509 includes a rechargeable battery, the rechargeable battery may support wired or wireless charging. The rechargeable battery may also be used to support a quick charging technology.

In some embodiments, the video synthesis device 50 also includes one or more sensors 510. The one or more sensors 510 include, but are not limited to: an acceleration sensor, a gyroscope sensor, a pressure sensor, a fingerprint sensor, an optical sensor, and a proximity sensor.

The acceleration sensor may detect a magnitude of acceleration in three coordinate axes of a coordinate system established by the video synthesis device 50. The gyroscope sensor may detect an organism direction and a turned angle of video synthesis device 50, and the gyroscope sensor may gather a 3D action of the user for the video synthesis device 50 with the acceleration sensor in coordination. The pressure sensors may be disposed on a side frame of the video synthesis device 50 and/or on a lower layer of the touch screen 505. When the pressure sensor is provided on the side frame of the video synthesis device 50, the use's holding signal with respect to the video synthesis device 50 may be detected. The fingerprint sensor is used for collecting a fingerprint of the user. The optical sensor is used for collecting an intensity of ambient light. A proximity sensor, also called a distance sensor, is usually provided on the front panel of the video synthesis device 50. The proximity sensor is used to determine a distance between the user and the front of the video synthesis device 50.

The present disclosure also provides a computer-readable storage medium, where instructions are stored, and when the instructions in the storage medium are executed by a processor of the video synthesis device, the video synthesis device is enabled to execute the video synthesis method provided in Embodiment 1 or Embodiment 2 of the present disclosure.

Embodiments of the present disclosure further provide a computer program product including instructions, which when run on the video synthesis apparatus, cause the video synthesis apparatus to perform the video synthesis method provided in Embodiment 1 or Embodiment 2 of the present disclosure.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

Other embodiments of the present disclosure will be apparent to those skilled in the art from consideration of the specification and practice of the invention disclosed herein. The present disclosure is intended to cover any variations, uses, or adaptations of the present disclosure following, in general, the principles of the present disclosure and including such departures from the present disclosure as come within known or customary practice in the art to which the present disclosure pertains. It is intended that the specification and examples be considered as exemplary only, with a true scope and spirit of the present disclosure being indicated by the following claims.

It will be understood that the present disclosure is not limited to the precise arrangements that have been described above and illustrated in the drawings, and that various modifications and changes may be made without departing from the scope thereof. The scope of the present disclosure is limited only by the appended claims.

What is claimed is:

1. A method for synthesizing a video, comprising:
displaying a video to be synthesized on a video editing interface for editing content of video data;
acquiring a friend recommendation list of a video editing user in response to a video sharing instruction from the video editing user, and displaying the friend recommendation list, wherein the friend recommendation list is used for indicating a plurality of sharing objects;
generating a synthesized video based on the video and a target sharing object on the video editing interface, wherein the synthesized video comprises other text information and a reminding mark for indicating the target sharing object displayed on a video picture of the synthesized video during playing of the synthesized video, and the reminding mark comprises an identification of the target sharing object and is configured to remind the target sharing object to watch the synthesize video, wherein the other text information and the identification of the target sharing object are displayed in different display modes; wherein the video editing interface comprises a sticker control;
wherein acquiring a friend recommendation list of a video editing user in response to a video sharing instruction from the video editing user, and displaying the friend recommendation list comprises:
displaying a sticker panel in response to a selection operation for the sticker control on the video editing interface, wherein the sticker panel comprises a plurality of sticker controls containing a friend sticker control; and
displaying a friend sticker on the video editing interface and displaying the friend recommendation list at a friend recommendation position displayed at a preset position on the video editing interface, in response to a sticker selection operation for the friend sticker control, wherein the friend sticker contains the video sharing instruction, wherein acquiring a friend recommendation list of a video editing user in response to a video sharing instruction from the video editing user, and displaying the friend recommendation list comprises:

displaying a text input box on the video editing interface in response to a text input operation on the video editing interface from the video editing user; and displaying the friend recommendation list at a friend recommendation position displayed at a preset position on the video editing interface in response to the video sharing instruction input by the video editing user in the text input box;

wherein before receiving the video sharing instruction input by the video editing user in the text input box, the method further comprises displaying a preset video editing item at the preset position on the video editing interface, wherein the preset video editing item is used for editing the video when selected;

wherein acquiring a friend recommendation list of a video editing user in response to a video sharing instruction from the video editing user, and displaying the friend recommendation list comprises:

displaying the friend recommendation list instead of the preset video editing item at the preset position on the video editing interface in response to the video sharing instruction; and displaying prompting information that the target sharing object is able to forward the other text information.

2. The method of claim 1, further comprising:
editing the friend sticker in response to an editing instruction for the friend sticker from the video editing user; wherein the editing instruction is used to change a style of the friend sticker, or rotate the friend sticker, or zoom in or out the friend sticker or drag the friend sticker.

3. The method of claim 1, wherein the text input operation comprises a long press operation on the video editing interface; or
the video editing interface comprises a text control, and the text input operation comprises a selection operation for the text control.

4. The method of claim 1, wherein the friend recommendation list comprises an identification of a user with whom a video is shared by the video editing user within a preset time period;
all identifications in the friend recommendation list are displayed at the friend recommendation positions in response to that a number of the identifications in the friend recommendation list is less than or equal to a number N of the friend recommendation list positions, in which N is a positive integer greater than or equal to 1, wherein the identification indicates a user with whom a video is shared within a preset time period; and
first N−1 identifications in the friend recommendation list are displayed at first N−1 friend recommendation positions and remaining identifications behind the first N−1 identifications are displayed when a last friend recommendation position is triggered, in response to that the number of the identifications in the friend recommendation list is larger than the number of the friend recommendation positions.

5. The method of claim 4, wherein the identifications in the friend recommendation list are arranged according to a duration from a time when a shared video is shared to a current time, from the shortest to the longest.

6. The method of claim 1, wherein acquiring a friend recommendation list of a video editing user in response to a video sharing instruction from the video editing user, and displaying the friend recommendation list comprises:
receiving a friend screening condition input by the video editing user after the video sharing instruction; and
adjusting identifications in the friend recommendation list in response to the friend screening condition to enable the identifications to satisfy the friend screening condition.

7. The method of claim 1, wherein the reminding mark is used for linking to a page corresponding to the target sharing object.

8. The method of claim 1, before determining the target sharing object in response to the selection instruction for the plurality of sharing objects from the video editing user, further comprising:
acquiring the selection instruction for the plurality of sharing objects from the video editing user;
in which the selection instruction comprises an identification for indicting a sharing object and a preset input instruction input after the video sharing instruction, or, the selection instruction comprises a selection operation for an identification contained displayed at the friend recommendation position.

9. The method of claim 1, after generating the synthesized video based on the video to be synthesized and the target sharing object, further comprising:
publishing the synthesized video on a video publishing interface in response to a video publishing instruction from the video editing user.

10. The method of claim 9, further comprising:
sending a sharing object prompting instruction to a server in response to the video publishing instruction from the video editing user; in which the sharing object prompting instruction is used for instructing the server to send prompting information corresponding to the synthesized video to a target terminal device; the target terminal device comprises a terminal device corresponding to the target sharing object.

11. An apparatus for synthesizing a video, comprising:
a processor;
a memory, configured to store instructions executable by the processor;
wherein the processor is configured to execute the instructions to implement the video synthesis method comprising:
display a video to be synthesized on a video editing interface for editing content of video data;
acquire a friend recommendation list of a video editing user in response to a video sharing instruction from the video editing user, and display the friend recommendation list, wherein the friend recommendation list is used for indicating a plurality of sharing objects;
determine a target sharing object in response to a selection instruction for the plurality of sharing objects from the video editing user;
generate a synthesized video based on the video and the target sharing object on the video editing interface, wherein the synthesized video comprises other text information and a reminding mark for indicating the target sharing object displayed on a video picture of the synthesized video during playing of the synthesized video, and the reminding mark comprises an identification of the target sharing object and is configured to remind the target sharing object to watch the synthesize video, wherein the other text information and the identification of the target sharing object are displayed in different display modes; wherein the video editing interface comprises a sticker control;

wherein the processor is configured to execute the instructions to display the friend recommendation list by performing the following:

displaying a sticker panel in response to a selection operation for the sticker control on the video editing interface, wherein the sticker panel comprises a plurality of sticker controls containing a friend sticker control; and displaying a friend sticker on the video editing interface and displaying the friend recommendation list at a friend recommendation position displayed at a preset position on the video editing interface, in response to a sticker selection operation for the friend sticker control, wherein the friend sticker contains the video sharing instruction;

wherein the processor is configured to execute the instructions to display the friend recommendation list by performing the following:

displaying a text input box on the video editing interface in response to a text input operation on the video editing interface from the video editing user; and displaying the friend recommendation list at a friend recommendation position displayed at a preset position on the video editing interface in response to the video sharing instruction input by the video editing user in the text input box;

wherein the processor is further configured to execute the instruction of displaying a preset video editing item at the preset position on the video editing interface, wherein the preset video editing item is used for editing the video when selected;

wherein the processor is configured to execute the instructions to acquire a friend recommendation list of a video editing user in response to a video sharing instruction from the video editing user, and display the friend recommendation list by performing the following:

displaying the friend recommendation list instead of the preset video editing item at the preset position on the video editing interface in response to the video sharing instruction; and displaying prompting information that the target sharing object is able to forward the other text information.

12. The apparatus of claim 11, the processor is configured to execute the instructions to perform the following:

editing the friend sticker in response to an editing instruction for the friend sticker from the video editing user; wherein the editing instruction is used to change a style of the friend sticker, or rotate the friend sticker, or zoom in or out the friend sticker or drag the friend sticker.

13. The apparatus of claim 11, wherein the friend recommendation list comprises an identification of a user with whom a video is shared by the video editing user within a preset time period;

wherein the processor is configured to execute the instructions to display the friend recommendation list by performing the following:

displaying all identifications in the friend recommendation list at the friend recommendation positions in response to that a number of the identifications in the friend recommendation list is less than or equal to a number N of the friend recommendation positions, in which N is a positive integer greater than or equal to 1, wherein the identification indicates a user with whom a video is shared within a preset time period; and displaying first N−1 identifications in the friend recommendation list at first N−1 friend recommendation positions and displaying remaining identifications behind the first N−1 identifications when a last friend recommendation position is triggered, in response to that the number of the identifications in the friend recommendation list is larger than the number of the friend recommendation positions.

14. The apparatus of claim 13, wherein the identifications in the friend recommendation list are arranged according to a duration from a time when a shared video is shared to a current time, from the shortest to the longest.

15. A non-transitory computer-readable storage medium, comprising instructions that, when executed by a processor of a video synthesis apparatus, cause the apparatus to perform the video synthesis method comprising:

displaying a video to be synthesized on a video editing interface for editing content of video data;

acquiring a friend recommendation list of a video editing user in response to a video sharing instruction from the video editing user, and displaying the friend recommendation list, wherein the friend recommendation list is used for indicating a plurality of sharing objects;

determining a target sharing object in response to a selection instruction for the plurality of sharing objects from the video editing user;

generating a synthesized video based on the video and the target sharing object on the video editing interface, wherein the synthesized video comprises other text information and a reminding mark for indicating the target sharing object displayed on a video picture of the synthesized video during playing of the synthesized video, and the reminding mark comprises an identification of the target sharing object and is configured to remind the target sharing object to watch the synthesize video, wherein the other text information and the identification of the target sharing object are displayed in different display modes; wherein the video editing interface comprises a sticker control;

wherein acquiring a friend recommendation list of a video editing user in response to a video sharing instruction from the video editing user, and displaying the friend recommendation list comprises:

displaying a sticker panel in response to a selection operation for the sticker control on the video editing interface, wherein the sticker panel comprises a plurality of sticker controls containing a friend sticker control; and displaying a friend sticker on the video editing interface and displaying the friend recommendation list at a friend recommendation position displayed at a preset position on the video editing interface, in response to a sticker selection operation for the friend sticker control, wherein the friend sticker contains the video sharing instruction;

wherein acquiring a friend recommendation list of a video editing user in response to a video sharing instruction from the video editing user, and displaying the friend recommendation list comprises:

displaying a text input box on the video editing interface in response to a text input operation on the video editing interface from the video editing user; and displaying the friend recommendation list at a friend recommendation position displayed at a preset position on the video editing interface in response to the video sharing instruction input by the video editing user in the text input box;

wherein before receiving the video sharing instruction input by the video editing user in the text input box, the method further comprises displaying a preset video editing item at the preset position on the video editing interface, wherein the preset video editing item is used for editing the video when selected;

wherein acquiring a friend recommendation list of a video editing user in response to a video sharing instruction from the video editing user, and displaying the friend recommendation list comprises:

displaying the friend recommendation list instead of the preset video editing item at the preset position on the video editing interface in response to the video sharing instruction; and displaying prompting information that the target sharing object is able to forward the other text information.

* * * * *